United States Patent
Dice et al.

(10) Patent No.: US 8,065,499 B2
(45) Date of Patent: Nov. 22, 2011

(54) METHODS AND APPARATUS TO IMPLEMENT PARALLEL TRANSACTIONS

(75) Inventors: David Dice, Foxborough, MA (US); Nir N. Shavit, Cambridge, MA (US)

(73) Assignee: Oracle America, Inc., Redwood City, CA (US)

( * ) Notice: Subject to any disclaimer, the term of this patent is extended or adjusted under 35 U.S.C. 154(b) by 632 days.

(21) Appl. No.: 11/475,262

(22) Filed: Jun. 27, 2006

(65) Prior Publication Data

US 2007/0198792 A1 Aug. 23, 2007

Related U.S. Application Data

(60) Provisional application No. 60/775,564, filed on Feb. 22, 2006, provisional application No. 60/775,580, filed on Feb. 22, 2006, provisional application No. 60/789,483, filed on Apr. 5, 2006.

(51) Int. Cl.
*G06F 12/08* (2006.01)

(52) U.S. Cl. ................. 711/163; 711/E12.032

(58) Field of Classification Search ............ None
See application file for complete search history.

(56) References Cited

U.S. PATENT DOCUMENTS

| | | | |
|---|---|---|---|
| 5,301,290 A * | 4/1994 | Tetzlaff et al. | 711/142 |
| 5,596,754 A * | 1/1997 | Lomet | 710/200 |
| 5,649,200 A | 7/1997 | Leblang et al. | |
| 5,950,199 A | 9/1999 | Schmuck et al. | |
| 5,956,731 A | 9/1999 | Bamford et al. | |
| 5,987,506 A | 11/1999 | Carter et al. | |
| 6,101,590 A | 8/2000 | Hansen | |
| 6,148,377 A | 11/2000 | Carter et al. | |
| 6,393,437 B1 | 5/2002 | Zinda et al. | |
| 6,757,893 B1 | 6/2004 | Haikin | |
| 6,810,470 B1 | 10/2004 | Wiseman et al. | |
| 6,826,570 B1 * | 11/2004 | Eshel et al. | 707/8 |
| 7,313,794 B1 | 12/2007 | Ansari | |
| 7,395,263 B2 | 7/2008 | McKenney | |
| 7,467,378 B1 | 12/2008 | Sobel | |
| 7,536,517 B2 | 5/2009 | Harris | |
| 2004/0117531 A1 * | 6/2004 | McKenney | 710/200 |
| 2005/0038961 A1 | 2/2005 | Chen | |

(Continued)

OTHER PUBLICATIONS

Herlihy, M., Moss, E., "Transactional Memory: Architectural Support for Lock-Free Data Structures", Proceedings of the Twentieth Annual International Symposium on Computer Architecture, 1993, pp. 1-12.

(Continued)

*Primary Examiner* — Hetul Patel
*Assistant Examiner* — Ryan Dare
(74) *Attorney, Agent, or Firm* — Brooks Kushman P.C.

(57) ABSTRACT

A computer system includes multiple processing threads that execute in parallel. The multiple processing threads have access to a global environment including different types of metadata enabling the processing threads to carry out simultaneous execution depending on a currently selected type of lock mode. A mode controller monitoring the processing threads initiates switching from one type of lock mode to another depending on current operating conditions such as an amount of contention amongst the multiple processing threads to modify the shared data. The mode controller can switch from one lock mode another regardless of whether any of the multiple processes are in the midst of executing a respective transaction. A most efficient lock mode can be selected to carry out the parallel transactions. In certain cases, switching of lock modes causes one or more of the processing threads to abort and retry a respective transaction according to the new mode.

14 Claims, 10 Drawing Sheets

U.S. PATENT DOCUMENTS

| | | | |
|---|---|---|---|
| 2006/0106996 A1 | 5/2006 | Ahmad et al. |
| 2006/0161919 A1 | 7/2006 | Onufryk et al. |
| 2006/0236039 A1 | 10/2006 | Golander |
| 2007/0124546 A1 | 5/2007 | Blanchard et al. |

OTHER PUBLICATIONS

Rajwar, R., Herlihy, M., Lai, K., "Virtualizing Transactional Memory", ISCA '05: Proceedings of the 32nd Annual International Symposium on Computer Architecture, Washington, DC, IEEE Computer Society, 2005, pp. 494-505.

Ananian, C.S., Asanovic, K., Kuszmaul, B.C., Leiserson, C.E., Lie, S., "Unbounded Transactional Memory", HPCA '05: Proceedings of the 11th International Symposium on High-Performance Computer Architecture, Washington, DC, IEEE Computer Society, 2005, pp. 316-327.

Hammond, L., Wong, V., Chen, M., Carlstrom, B.D., Davis, J.D., Hertzberg, B., Prabhu, M.K., Wijaya, H., Kozyrakis, C., Olukotun, K., "Transactional Memory Coherence and Consistency", ISCA '04: Proceedings of the 31st Annual International Symposium on Computer Architecture, Washington, DC, IEEE Computer Society, 2004.

Ennals, R., "Software Transactional Memory Should Not Be Obstruction-Free", www.cambridge,intel-research.net/rennals/notlockfree.pdf, 2005, pp. 1-10.

Fraser, K., Harris, T., "Concurrent Programming Without Locks", www.cl.cam.ac.uk/Research/SRG/netos/papers/2004-cpwl-submission.pdf, 2004, pp. 1-48.

Herlihy, M., "SXM: C# Software Transactional Memory", http://www.cs.brown.edu/~mph/SXM/README.doc, 2005.

Herlihy, M., Luchangco, V., Moir, M., Scherer III, W.N., "Software Transactional Memory for Dynamic-Sized Data Structure", Proceedings of the 22nd Annual ACM Symposium on Principles of Distributed Computing, 2003.

Marathe, V.J., Scherer III, W.N., Scott, M.L., "Design Tradeoffs in Modern Software Transactional Memory Systems", LCR '04: Proceedings of the 7th Workshop on Workshop on Languages, Compilers, and Run-Time Support for Scalable Systems, New York, NY, ACM Press, 2004.

Marathe, V.J., Scherer III, W.N., Scott, M.L., "Adaptive Software Transactional Memory", Proceedings of the 19th International Symposium on Distributed Computing, Cracow, Poland, 2005, pp. 354-368.

Moir, M., "Hybrid Transactional Memory", Technical Report Archivist 2004-0661, Sun Microsystems Research, 2004, pp. 1-15.

Saha, B., Adl-Tabatabai, A.R., Hudson, R.L., Minh, C.C., Hertzberg, B., "McRT-STM: A High Performance Software Transactional Memory System for a Multi-Core Runtime", PPoPP '06, Mar. 29-31, 2006, New York, NY, pp. 187-192.

Shalev, O., Shavit, N., "Predictive Log-Synchronization", EuroSys 2006, Apr. 18-21, 2006, Leuven, Belgium, pp. 305-315.

Shavit, N., Touitou, D., "Software transactional memory", Distributed Computing 10(2), 1997, p. 99-116.

Welc, A., Jagannathan, S., Hosking, A.L., "Transactional Monitors for Concurrent Objects", Proceedings of the European Conference on Object-Oriented Programming, vol. 3086 of Lecture Notes in Computer Science, Springer-Verlag, 2004, pp. 519-542.

Ananian, C.S., Rinard, M., "Efficient Object-Based Software Transactions", Proceedings of Synchronization and Concurrency in Object-Oriented Languages (SCOOL), ACM, 2005.

Kumar, S., Chu, M., Hughes, C.J., Kundu, P., Nguyen, A., "Hybrid Transactional Memory", PPoPP 2006, Mar. 29-31, 2006, New York, NY, pp. 209-220.

Harris, T., Fraser, K., "Language Support for Lightweight Transactions", SIGPLAN Not. 38(11), 2003, pp. 388-402.

Dice, D., Shavit, N., "What Really Makes Transactions Faster?", TRANSACT06 ACM Workshop, 2006.

Afek, Y., Attiya, H., Dolev, D., Gafni, E., Merritt, M., Shavit, N., "Atomic Snapshots of Shared Memory", J. ACM 40(4), 1993, pp. 873-890.

Agesen, O., Detlefs, D., Garthwaite, A., Knippel, R., Ramakrishna, Y.S., White, D., "An Efficient Meta-lock for Implementing Ubiquitous Synchronization", ACM SIGPLAN Notices 34(10), 1999, pp. 207-222.

Dice, D., "Implementing Fast Java Monitors with Relaxed-Locks", Proceedings of the Java Virtual Machine Research and Technology Symposium (JVM '01), Monterey, California, Apr. 23-24, 2001, pp. 79-90.

Bloom, B.H., "Space/Time Trade-offs in Hash Coding with Allowable Errors", Communications of the ACM, vol. 13, No. 7, Jul. 1970, pp. 422-426.

Boehm, H.J., "Space Efficient Conservative Garbage Collection", SIGPLAN Conference on Programming Language Design and Implementation, 1993, pp. 197-206.

Michael, M.M., "Hazard Pointers: Safe Memory Reclamation for Lock-Free Objects", IEEE Trans. on Parallel and Distributed Systems, vol. 15, No. 6, 2004, pp. 491-504.

Herlihy, M., Luchangco, V., Moir, M., "The Repeat Offender Problem: A Mechanism for Supporting Dynamic-Sized, Lock-Free Data Structures", Proceedings of the 16th International Symposium on Distributed Computing, vol. 2508, Springer-Verlag Heidelberg, 2002, pp. 339-353.

Hart, T.E., McKenney, P.E., Brown, A.D., "Making Lockless Synchronization Fast: Performance Implications of Memory Reclamation", IEEE, 2006.

Fraser, K., "Practical lock-freedom", Technical Report, No. 579, University of Cambridge, Computer Laboratory, Feb. 2004, pp. 1-116.

Hanke, S., "The Performance of Concurrent Red-Black Tree Algorithms", Lecture Notes in Computer Science 1668, 1999, pp. 286-300.

Rajwar, R., Hill, M., "Transactional Memory Online", http://www.cs.wisc.edu/trans-memory, 2006.

Purcell, C., Harris, T, "Brief Announcement: Implementing Multi-Word Atomic Snapshots on Current Hardware", PODC'04, Jul. 25-28, 2004, St. Johns, Newfoundland, Canada.

Non-Final Office Action dated Jan. 22, 2009 for U.S. Appl. No. 11/475,814, 10 pgs.

Reply to Non-Final Office Action dated Jan. 22, 2009 for U.S. Appl. No. 11/475,814, filed Apr. 20, 2009, 11 pgs.

Non-Final Office Action dated Feb. 22, 2010 for U.S. Appl. No. 11/699,802, 10 pgs.

Reply to Non-Final Office Action dated Feb. 22, 2010 for U.S. Appl. No. 11/699,802, filed May 21, 2010, 13 pgs.

Non-Final Office Action dated Nov. 9, 2010 for U.S. Appl. No. 11/475,716, 26 pgs.

Amendment filed Feb. 4, 2011 in response to Non-Final Office Action dated Nov. 9, 2010, for U.S. Appl. No. 11/475,716, filed Jun. 27, 2006, 10 pgs.

Non-Final Office Action dated Dec. 8, 2010 for U.S. Appl. No. 11/475,604, filed Jun. 27, 2006, 28 pgs.

Final Office Action dated Apr. 5, 2011 for U.S. Appl. No. 11/475,716, filed Jun. 27, 2006, 20 pgs.

(Amendment) Response to Non-Final Office Action dated Dec. 8, 2010 for U.S. Appl. No. 11/475,604, filed Mar. 17, 2011, 13 pgs.

Final Office Action dated May 23, 2011 for U.S. Appl. No. 11/475,604, 20 pgs.

Lev et al., "Fast read sharing mechanism for software transactional memory", 23rd Annual ACM SIGACT-SIGOPS Symposium on Principles of Distributed Computing (PODC 2004), Jul. 2004.

Response dated Jun. 30, 2011 to Final Office Action dated Apr. 5, 2011 for U.S. Appl. No. 11/475,716, 10 pgs.

* cited by examiner

METHODS AND APPARATUS TO IMPLEMENT PARALLEL TRANSACTIONS

RELATED APPLICATIONS

This application claims the benefit of and priority to U.S. Provisional Patent Application Ser. No. 60/775,564, filed on Feb. 22, 2006, entitled "Switching Between Read-Write Locks and Transactional Locking," the entire teachings of which are incorporated herein by this reference.

This application is related to U.S. patent application Ser. No. 11/475,604, filed on same date as the present application, entitled "METHODS AND APPARATUS TO IMPLEMENT PARALLEL TRANSACTIONS," which itself claims the benefit of and priority to U.S. Provisional Patent Application Ser. No. 60/775,564, filed on Feb. 22, 2006, entitled "Switching Between Read-Write Locks and Transactional Locking," the entire teachings of which are incorporated herein by this reference.

This application is related to U.S. patent application Ser. No. 11/475,716, filed on same date as the present application, entitled "METHODS AND APPARATUS TO IMPLEMENT PARALLEL TRANSACTIONS," which itself claims the benefit of and priority to U.S. Provisional Patent Application Ser. No. 60/775,580, filed on Feb. 22, 2006, entitled "Transactional Locking," the entire teachings of which are incorporated herein by this reference.

This application is related to U.S. patent application Ser. No. 11/475,814, filed on same date as the present application, entitled "METHODS AND APPARATUS TO IMPLEMENT PARALLEL TRANSACTIONS," which itself claims the benefit of and priority to U.S. Provisional Patent Application Ser. No. 60/789,483, filed on Apr. 5, 2006, entitled "Globally Versioned Transactional Locking," the entire teachings of which are incorporated herein by this reference.

BACKGROUND

There has been an ongoing trend in the information technology industry to execute software programs more quickly. For example, there are various conventional advancements that provide for increased execution speed of software programs.

One technique for increasing execution speed of a program is called parallelism. Parallelism is the practice of executing or performing multiple things simultaneously. Parallelism can be possible on multiple levels, from executing multiple instructions at the same time, to executing multiple threads at the same time, to executing multiple programs at the same time, and so on. Instruction Level Parallelism or ILP is parallelism at the lowest level and involves executing multiple instructions simultaneously. Processors that exploit ILP are typically called multiple-issue processors, meaning they can issue multiple instructions in a single clock cycle to the various functional units on the processor chip.

There are different types of conventional multiple-issue processors. One type of multiple-issue processor is a superscalar processor in which a sequential list of program instructions are dynamically scheduled. A respective processor determines which instructions can be executed on the same clock cycle, and sends them out to their respective functional units to be executed. This type of multi-issue processor is called an in-order-issue processor since issuance of instructions is performed in the same sequential order as the program sequence, but issued instructions may complete at different times (e.g., short instructions requiring fewer cycles may complete before longer ones requiring more cycles).

Another type of multi-issue processor is called a VLIW (Very Large Instruction Width) processor. A VLIW processor depends on a compiler to do all the work of instruction reordering and the processor executes the instructions that the compiler provides as fast as possible according to the compiler-determined order. Other types of multi-issue processors issue out of order instructions, meaning the instruction issue order is not be the same order as the order of instructions as they appear in the program.

Conventional techniques for executing instructions using ILP can utilize look-ahead techniques to find a larger amount of instructions that can execute in parallel within an instruction window. Looking-ahead often involves determining which instructions might depend upon others during execution for such things as shared variables, shared memory, interference conditions, and the like. When scheduling, a handler associated with the processor detects a group of instructions that do not interfere or depend on each other. The processor can then issue execution of these instructions in parallel thus conserving processor cycles and resulting in faster execution of the program.

One type of conventional parallel processing involves a use of coarse-grained locking. As its name suggests, coarse-grained locking over a large segment of shared data prevents conflicting groups of code from operating on different processes at the same time based on use of lockouts. Accordingly, this technique enables non-conflicting transactions or sets of instructions to execute in parallel.

Another type of conventional parallel processing involves a use of fine-grain locking. As its name suggests, fine-grain locking over a small region of memory prevents conflicting instructions from being simultaneously executed in parallel based on use of lockouts. This technique therefore enables non-conflicting instructions to execute in parallel.

SUMMARY

Conventional applications that support parallel processing can suffer from a number of deficiencies. For example, although easy to implement from the perspective of a software developer, coarse-grained locking techniques provide very poor performance because of limitations on parallelism. Although fine-grain lock-based concurrent software can perform exceptionally well during run-time, developing such code can be a very difficult task for a respective one or more software developers.

Techniques discussed herein deviate with respect to conventional applications such as those discussed above as well as other techniques known in the prior art. For example, embodiments herein include novel techniques for enhancing performance associated with transactions executing in parallel.

In general, the present disclosure describes a unique way for each of multiple processes to operate in parallel using a common set of data (e.g., shared data) without causing corruption to the shared data. For example, as will be discussed later in this specification, a computer system includes multiple processing threads that execute in parallel. The computer system maintains an environment for executing the multiple processing threads in parallel. During execution of the multiple processing threads, the computer system can support switching a manner of the execution between transactional memory usage and non-transactional memory usage of a region of respective shared data.

The multiple processing threads have access to a global environment including shared data utilized by the multiple processing threads to produce a respective transaction outcome. The global environment includes different types of metadata associated with the shared data. A first type of metadata in the global environment enables multiple parallel processing threads to implement transactional memory usage according to a first type of lock mode. A second type of metadata in the global environment enables the multiple parallel processing threads to implement transactional memory usage according to a second type of lock mode.

In one embodiment, for purposes of implementing a first type of lock mode such as a centralized lock mode, the global environment includes global version information and respective global lock information enabling a respective one of the multiple processing threads to initiate coarse-grained locking and modifications to any portion of the shared data. In the centralized lock mode, only a single processing thread holding a lock can modify the shared data.

For purposes of implementing a second type of lock mode such as a distributed lock mode, the global environment includes segment version information and respective segment lock information associated with each corresponding portion (e.g., segment) of the shared data. Based on use of the segment lock information, each of multiple processing threads can hold different respective locks on corresponding segments of the shared data and perform modifications while in the distributed lock mode. The segment version information enables the processing threads to update and identify when the corresponding segments of shared data have been modified. Thus, in this latter mode, multiple processing threads can simultaneously modify contents of the shared data without causing data corruption. Recall that the centralized lock mode enables only one processing thread to modify the shared data at a time.

Depending on current operating conditions such as an amount of contention amongst the multiple processing threads to modify the shared data, a most efficient lock mode can be selected to carry out the parallel transactions. A mode controller can initiate switching from one type of lock mode to another regardless of whether any of the multiple processes are in the midst of executing a respective transaction according to a given mode setting.

This technique of enabling switching between different types of lock modes is useful in applications that experience changes in operating conditions such as changing conditions in which multiple processing threads execute many more reads than writes or vise versa. For example, at a given moment in time, a first type of lock mode may be inefficient for carrying out parallel processing while a second type of lock mode is well suited for carrying out respective transactions. At another moment in time, the first type of lock mode may be more efficient for carrying out parallel processing while the second type of lock mode may be inefficient for carrying out respective transactions. As discussed above, depending on current conditions such as whether or not there is a lot of contention amongst the parallel processing threads to write to a common region of shared data, an appropriate lock mode can be selected for carrying out the parallel processing threads. In one embodiment, the lock mode can be changed to a new lock mode even though one or more of multiple processing threads is currently is in the midst of operating according to an old lock mode.

Techniques herein are well suited for use in applications such as those executing multiple processing threads in parallel and it is beneficial to switch between different types of lock modes for modifying shared data. However, it should be noted that configurations herein are not limited to such use and thus configurations herein and deviations thereof are well suited for use in other environments as well.

In addition to the embodiments discussed above, other embodiments herein include a computerized device (e.g., a host computer, workstation, etc.) configured to support the techniques disclosed herein such as use of a globally accessible variable (e.g., version information) supporting parallel execution of transaction performed by different processes. In such embodiments, a computer environment can include a memory system, a processor (e.g., a processing device), a respective display, and an interconnect connecting the processor and the memory system. The interconnect can also support communications with the respective display (e.g., display screen or display medium). The memory system can be encoded with one or more applications that, when executed on a respective processor, supports parallel processing according to techniques herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to support parallel processing according to embodiments herein.

For example, the computer program logic, when executed on at least one processor associated with a computing system, causes the processor to perform the operations (e.g., the methods) indicated herein as embodiments of the present disclosure. Such arrangements as further disclosed herein can be provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product or computer environment that includes a computer readable medium having instructions stored thereon to facilitate use of shared information among multiple processes. Each of the multiple processes can support a technique of: i) initiating execution of a given processing thread including multiple instructions, the given processing thread producing a respective transaction outcome based on use of globally accessible shared data also accessible by other processing threads executing in parallel; and ii) during execution of the given thread, initiate multiple reads of data from the globally accessible shared data for purposes of producing the transaction outcome; and iii) selectively switching execution of the given processing thread according to one of multiple different types of lock modes including a centralized lock mode in which the given processing thread competes with the multiple processing threads to obtain a coarse-grained lock over respective shared data and a distributed lock mode in which the given processing thread competes with the multiple processing threads to obtain finer-grained locks over sub-portions of the respective shared data.

Other embodiments of the present disclosure include hardware and/or software programs to perform any of the method embodiment steps and operations summarized above and disclosed in detail below.

It is to be understood that the system of the invention can be embodied as a software program, as software and hardware, and/or as hardware alone. Example embodiments of the invention may be implemented within computer systems, processors, and computer program products and/or software applications manufactured by Sun Microsystems Inc. of Palo Alto, Calif., USA.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one embodiment, a computer system includes multiple processing threads that execute in parallel. The computer system can include an environment for switching of the processing threads amongst transactional memory usage and non-transactional memory usage of a region of respective shared data. The memory usage modes can be lock-free or lock-based memory usage modes although specific embodiments herein discuss use of lock-based memory usage modes.

For example, the multiple processing threads have access to a global environment including different types of metadata enabling the processing threads to carry out respective simultaneous executions depending on a currently selected type of memory usage mode such as a transactional memory usage and non-transactional memory usage. Each of the transactional memory usage and non-transactional memory usage modes can be lock free or include a lock mode. According to one embodiment herein, implementing transactions according to a currently selected lock mode prevents data corruption as a result of multiple processing threads simultaneously changing shared data.

In one embodiment, a mode controller monitoring the processing threads initiates switching from one type of memory usage mode to another. For example, the mode controller can initiate switching from one lock mode to another depending on current operating conditions such as an amount of contention amongst the multiple processing threads to modify the shared data. The mode controller can switch from one lock mode another regardless of whether any of the multiple processes are in the midst of executing a respective transaction. A most efficient memory usage mode and/or type of memory lock mode can be selected to carry out the parallel transactions. In certain cases, switching of modes causes one or more of the processing threads to abort and/or retry a respective transaction according to the new mode.

Figure 1:
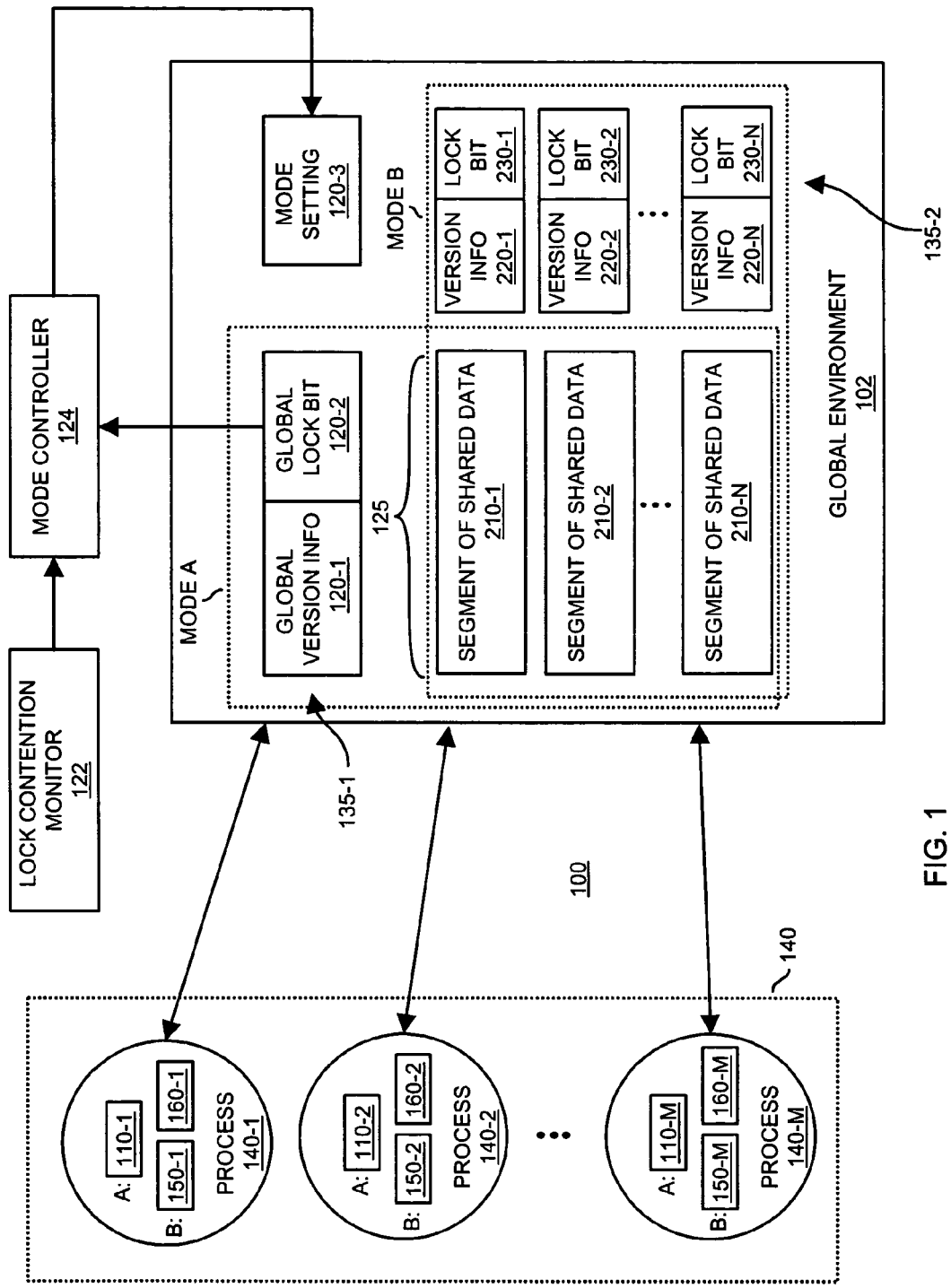
FIG. 1 is a diagram illustrating a computer environment including multiple parallel processes that access shared data according to embodiments herein.

FIG. 1 is a block diagram of a computer environment 100 according to an embodiment herein. As shown, computer environment 100 includes shared data 125 (e.g., which can be partitioned according to segments 210) and corresponding metadata 135 in global environment 102 (e.g., a respective repository such as memory) that is globally accessible by multiple processes 140 such as process 140-1, process 140-2, . . . process 140-M. Mode setting information 120-3 identifies a current selection of a lock mode for carrying out simultaneous execution by the multiple processes 140 (e.g., process 140-1, process 140-2, . . . , process 140-M). To carry out execution according to mode A (e.g., a so-called M4 lock mode), each of processes 140 (e.g., processing threads) utilizes global version information 120-1 and global lock bit 120-2 and has an associated local repository 110-1 (e.g., an exclusive portion of memory). For example, in one embodiment, each of processes 140 (e.g., processing threads) has a corresponding local repository 110 for storing information such as an instantaneous value of version information 120-1 at different times during execution of a corresponding set of multiple instructions. To carry out execution according to mode B (e.g., a so-called TL or transactional locking mode), each of processes 140 (e.g., processing threads) utilizes version information 220 and global lock bit 230 to maintain an associated read-set 150 and write-set 160 (e.g., exclusive portions of memory).

As discussed above, the present disclosure describes a unique way for each of multiple processes 140 to operate in parallel using a common set of shared data 125 without causing corruption to the shared data 125. For example, computer environment 100 includes multiple processes 140 that execute in parallel. The multiple processes 140 access shared data 125 in the global environment 102 (e.g., memory).

Global environment 102 includes different types of metadata 135 associated with the shared data 125. For example, global environment 102 includes metadata 135-1 and metadata 135-2. The first type of metadata 135-1 enables the processes 140 to implement memory usage according to mode A (e.g., a non-transactional memory usage mode. The second type of metadata 135-2 enables the processes 140 to implement transactional memory usage according to a second type of mode (e.g., mode B or a transactional memory usage mode).

Transactional memory usage according to one embodiment herein basically involves breaking up a program to atomic chunks of code called transactions. The transactions pass data to each other through use of shared memory. In such a mode, the transactions are stored in a location other than the shared memory such as a write buffer, cache, etc. until the transaction completes execution. When the transaction ends, the transaction commits results to memory. At the point of committing the results, any uncommitted transactions of the other processing threads that used the same data as the processing thread committing its results must roll back (e.g., via an undo log) and re-execute the transaction.

For purposes of implementing a centralized type of lock mode (e.g., a non-transactional memory usage mode based on a first type of lock mode), the global environment 102 includes global version information 120-1 and a respective global lock bit 120-2 (e.g., global lock information) enabling a respective one of the multiple processes 140 to initiate coarse-grained locking and modifications to an overall region of shared data 125 including multiple segments such as segment 210-1, segment 210-2, . . . , segment 210-N. In the centralized lock mode, only a single processing thread or process 140 holding a single lock (e.g., the global lock bit 120-2) can modify the shared data 125. After completing modification to shared data 125, a respective process 140 releases a lock by changing a state of the global lock bit 120-1 back to the free mode.

For purposes of implementing parallel transaction while in a distributed lock mode (e.g., a transactional memory usage mode having an associated second type of lock mode), the global environment 102 includes segment version information 220 and respective segment lock bit information 230 associated with respective segments 210 (e.g., portions) of shared data 125. Based on use of the segment lock bit information 230, each of multiple processing threads can hold different respective locks on corresponding segments of the shared data while in the distributed lock mode. For example, one process can hold a lock on one segment while another process holds at least lock on another segment, and so on. Respective segment version information 220 enables the processes 140 to identify when the corresponding segment of shared data has been modified. Accordingly, when in mode B, multiple processes can simultaneously modify contents of the shared data 125 without causing data corruption.

Depending on current operating conditions such as an amount of contention amongst the multiple processes to modify the shared data 125, a most efficient memory usage mode can be selected to carry out the parallel transactions. In the context of one embodiment, a mode controller 124 can initiate switching from one type of lock mode (e.g., transactional memory usage) to another type of mode (e.g., a non-transactional memory usage by modifying contents of mode setting information 120-3 in global environment 102) regardless of whether any of the multiple processes 140 are in the midst of executing a respective transaction. The mode controller 124 can base a current setting of the current lock mode type depending on input from lock contention monitor 122. In one embodiment, lock contention monitor 122 monitors how often each of the processes 140 has to abort as a result of contention with other processes.

As shown and as discussed above, the mode controller 124 can be implemented as a separate entity with respect to processes 140. In one embodiment, functionality associated with the mode controller 124 can instead be provided by one or more of processes 140. For example, any or all of processes 140 can be programmed to modify respective mode setting information 120-3 to change a current mode setting of global environment 102. The mode setting options can include a transactional memory usage mode and a non-transactional memory usage mode for executing the processing threads. Other types of selectable modes include a centralized lock-based mode (e.g., a non-transactional memory usage mode) versus a distributed lock mode (e.g., a transactional memory usage mode).

This disclosed technique of enabling switching between different types of memory usage modes is useful in applications that experience changes in operating conditions such as multiple processing threads that execute many more reads than writes and vise versa. For example, at a given moment in time, a first type of mode may be inefficient for carrying out parallel processing while a second type of lock mode is well suited for carrying out respective transactions. At another moment in time, the first type of mode may be more efficient for carrying out parallel processing while the second type of mode may be inefficient for carrying out respective transactions.

Depending on current conditions such as whether or not there is a lot of contention amongst the processes 140 to write to a common region of shared data 125, an appropriate mode (e.g., mode A or mode B or yet other possible modes) can be selected for carrying out the parallel processing threads. As mentioned above, the mode can be changed to a new mode even though one or more of multiple processes 140 happens to be in the midst of operating according to an old lock mode. If a process 140-1 cannot gracefully complete without causing data corruption as a result of a mode change, then the respective one or more processes 140 can be aborted (e.g., self-aborted).

Figure 2:
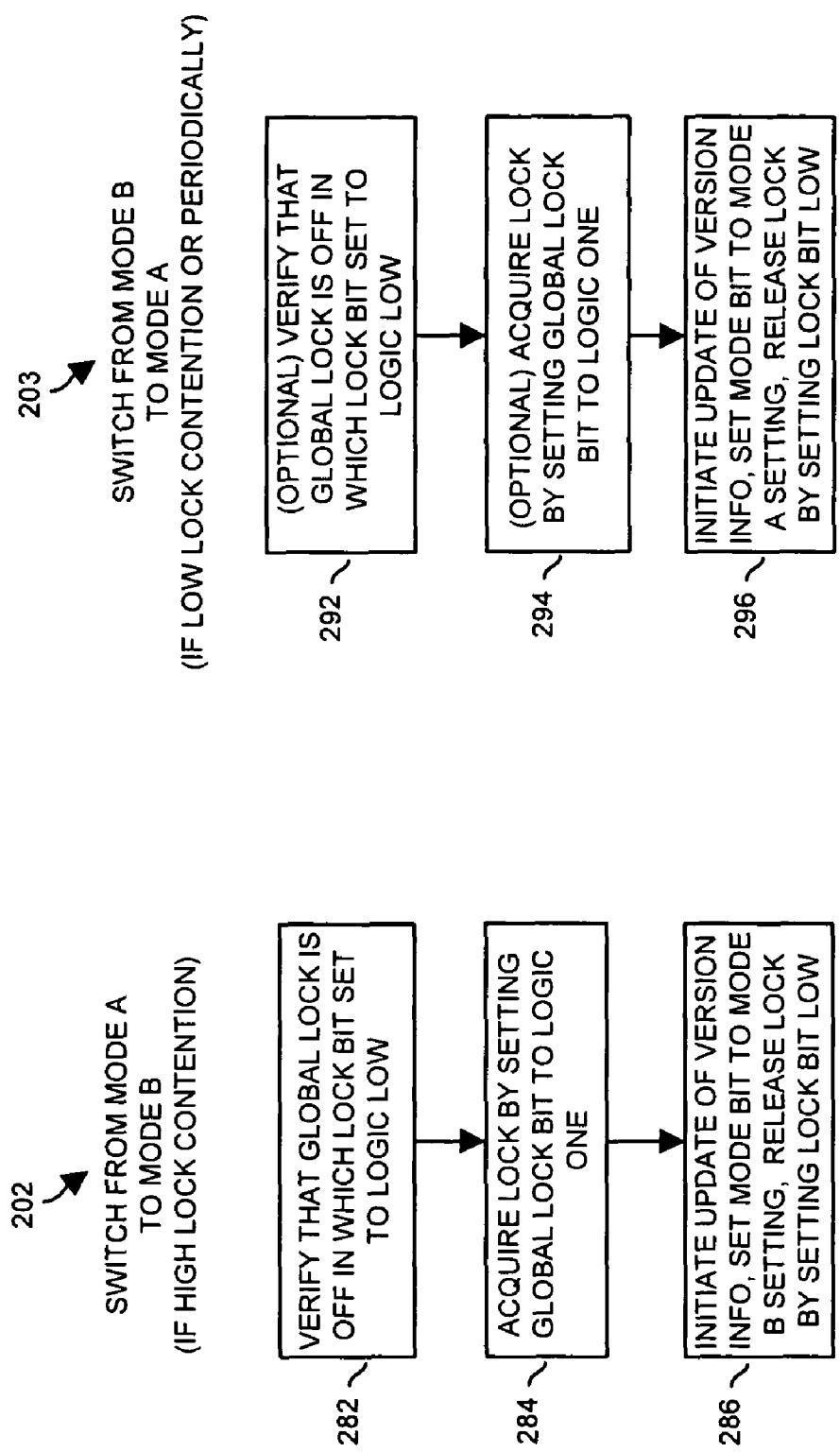
FIG. 2 is a diagram illustrating switching between multiple lock modes according to embodiments herein.

FIG. 2 is a block diagram illustrating how to switch modes (e.g., modify mode setting information 120-3 from a transactional memory usage to non-transactional memory usage or from a centralized lock mode to a distributed type lock mode) according to an embodiment herein. Flowchart 202 illustrates how mode controller 124 (in FIG. 1) switches from mode A (e.g., a centralized type of transactional memory lock mode) to mode B (e.g., a distributed type of memory lock mode) if there exists high lock contention amongst the multiple processes 140 executing in parallel. Flowchart 203 illustrates how mode controller 124 (in FIG. 1) switches from mode B (e.g., a distributed transactional memory usage mode) to mode A (e.g., a centralized non-transactional memory usage memory lock mode) if there exists low lock contention amongst the multiple processes 140 executing in parallel. Note that the mode controller 124 can also occasionally or periodically switch from one mode to another for purposes of testing which mode is best suited at any given moment.

To switch from mode A (e.g., a non-transactional memory usage mode) to mode B (e.g., a transactional memory usage mode), the mode controller 124 initially verifies that the global lock bit 120-2 is inactive (e.g., set to a logic low or unasserted state) indicating that none of the processes 140 owns a lock over shared data 125 in step 282.

If there is no lock, the mode controller 124 acquires a respective lock by setting the global lock bit 120-2 to a logic one to activate a lock over the shared data 125 in step 284. Once obtained, the lock obtained by the mode controller 124 prevents the processes 140 from obtaining a respective lock and modifying shared data 125. This technique of waiting to acquire the global lock bit 120-2 (when it is free) enables another process 140 holding the lock to complete committing results to shared data 125. Thus, such a process will not need to abort as a result of a mode change from mode A to mode B.

In step 286, after obtaining the lock, the mode controller 124 updates (e.g., increments) the global version information 120-1, sets the mode setting 120-3 to mode B setting for global environment 102. After completion of these operations, the mode controller 124 releases the lock over shared data 125 by setting the global lock bit 120-2 back to a logic zero.

To switch from mode B to mode A according to flowchart 203, the mode controller 124 initially verifies that the global lock bit 120-2 is inactive indicating that none of the processes 140 owns a lock over shared data 125 in step 292.

If there is no lock present as initiated by the other processes 140, the mode controller 124 acquires a respective lock by setting the global lock bit 120-2 to a logic one to activate a lock over the shared data 125 in step 294. Once obtained, the lock prevents the processes from obtaining a respective lock and modifying shared data 125. This technique of waiting to acquire the global lock bit 120-2 when it is free enables another process 140 holding the lock to complete committing results to shared data 125. Thus, such a process holding the lock will not need to abort as a result of a mode change from mode B to mode A.

In step 296, the mode controller 124 updates (e.g., increments) the global version information 120-1, sets the mode setting 120-3 to mode A setting for global environment 102. After completion of these operations, the mode controller 124 releases the lock over shared data 125 by setting the global lock bit 120-2 back to a logic zero.

Note that step 292 and step 293 may not be performed according to one embodiment herein. For example, when switching from mode B to mode A, the mode controller 124 changes the mode setting 120-3 without regard to whether another process 140 has a current lock over shared data 125.

Figure 3:
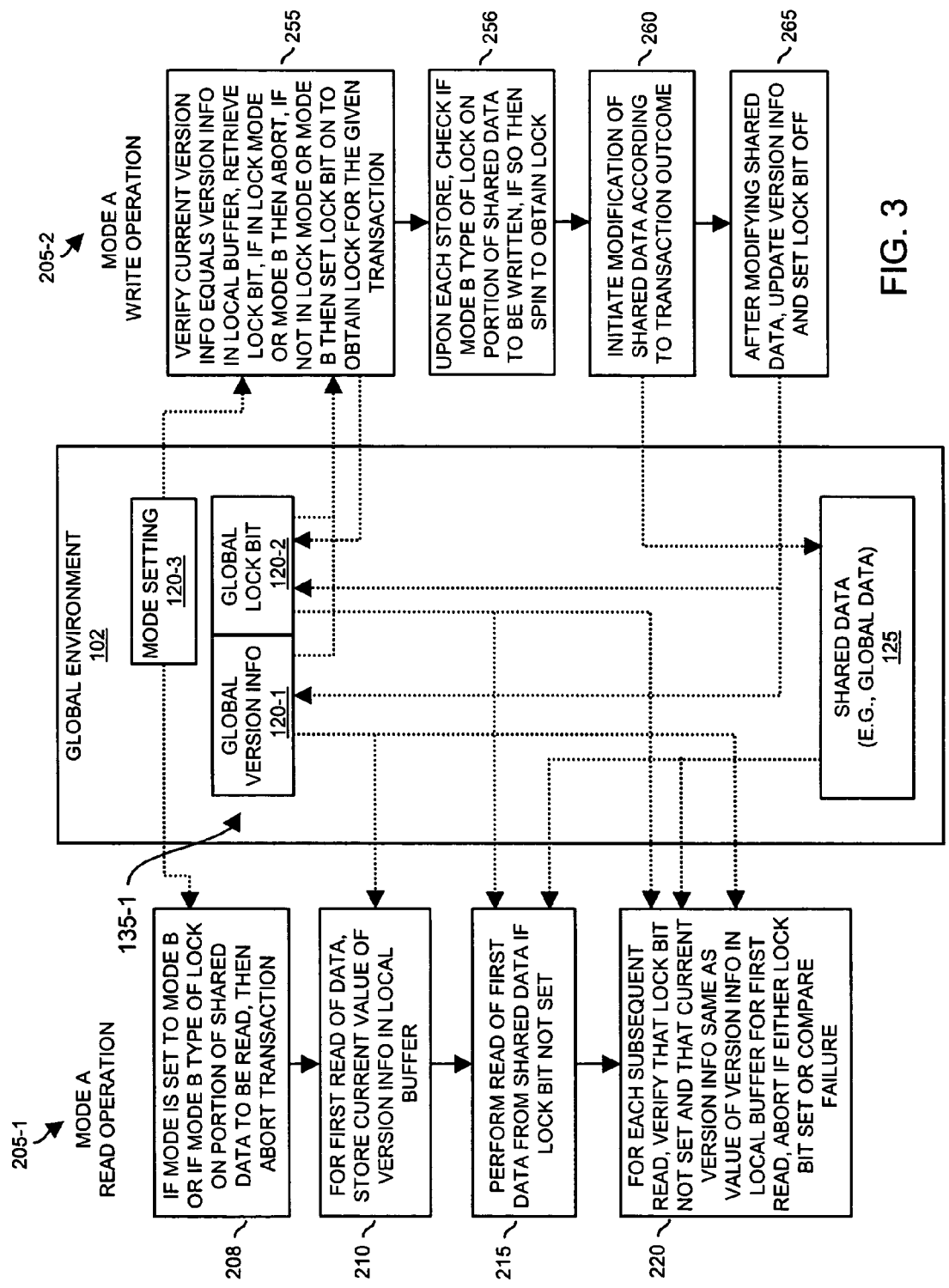
FIG. 3 is a diagram of a first type of lock mode according to embodiments herein.

FIG. 3 is a diagram more particularly illustrating details associated with a respective process operating in mode B (e.g., a centralized lock mode) according to embodiments herein. For clarity sake, FIG. 3 illustrates read and write operations that can be performed by any one of the multiple processes 140 while in mode B. For example, each of the multiple processes 140 can simultaneously perform read operations. In general, the processes 140 do not compete with each other to perform read type of operations. However, a respective process must obtain a lock over global environment 102 (e.g., shared data 125) before modifying or writing to contents of shared data 125.

Each of the multiple processes 140 can perform a respective read operation 205-1 to retrieve one or more data values associated with shared data 125. Assume in the following example that process 140-1 carries out read operation 205-1. Note that each process 140 can simultaneously operate in a similar manner while in mode A.

Brief Description of Utilizing Mode A (e.g., M4 mode)

In step 208, a given process 140-1 (e.g., any one of multiple processes 140) executing a read operation checks mode setting information 120-3 to identify whether global environment 102 is set to mode B (e.g., a transactional memory usage mode) as opposed to mode A (e.g., a non-transactional memory usage mode). If so, the given process aborts. Additionally, in step 208, the given process checks whether there is a corresponding segment lock (e.g., a leftover lock existing from a process operating in mode B as will be discussed later in this specification) present for a respective portion of data to be read from shared data 125. For example, the given process looks at respective lock bit information 230 associated with the segment (or portion thereof) to be read. If there is a lock present, another process is currently modifying the segment and the given process aborts. Otherwise, after passing these above tests, processing continues as follows.

When carrying out such a read operation as illustrated in step 210, process 140-1 first checks whether a respective global lock bit 120-2 has been set by another process currently modifying shared data 125. If the global lock bit 120-2 is not set, the respective process fetches and stores a current value of global version information 120-1 in its local repository 110-1. For example, the version information at a time of this first read may be 000145. The process 140-1 stores this instantaneous data value of 000145 in its local repository 110-1. Note that the local repository can be a specific location of shared data assigned for use by only a respective process.

In step 215, the given process performs a read of a portion (e.g., one or more locations) of shared data 125. In one embodiment, the given process can fetch the global version information again after performing the read of data to verify whether or not to abort a respective transaction. Also, note that an ordering of steps 210 and 215 can be reversed depending according to different embodiments.

The process 140-1 eventually performs subsequent reads as indicated in step 220. For each subsequent read of shared data 125, the process verifies that the global lock bit 120-2 is not set by another one of the multiple processes 140. Additionally, the process 140-1 checks whether a current value of the version information 120-1 has been modified since the last read. In one embodiment, a transactional load associated with step 220 can be carried out by first fetching data from memory and thereafter fetching (& validating) the version information based on a comparison technique as discussed above.

For example, after obtaining a current value of global version information 120-1 after a respective read, the process 140-1 compares an instantaneous data value of the retrieved global version information 120-1 (at a time of the subsequent read) to the data value stored in local repository 110-1. If they match (e.g., the instantaneous data value of the version information 120-2 is still 000145), the process 140-1 can continue executing a respective transaction. If not, such as when the instantaneous data value of the version information 120-1 is 000146 indicating that another process modified shared data 125, then the process 140-1 aborts the transaction and retries from the start.

Note that in one embodiment, each of the processes 140 increments a respective value of the version information 120-1 upon committing corresponding results of a transaction to shared data 125. In this latter case resulting in abortion, any intermediate data values generated by a respective processing thread prior to abortion are disregarded.

Also, as mentioned, steps 210 through 220 can be carried out in any order according to other embodiments herein. For example, in one embodiment, a transactional load can be carried out by first fetching and validating the global version information and thereafter retrieving data from memory. For a respective first load transaction, the order of operation can include first fetching the shared data, then fetching the version information, for storage in the local repository associated with the given process.

Each of the processes 140 can also perform a write operation 205-2. A write operation involves modifying contents of shared data 125 during a so-called write phase. At the write-time in M4, if there were any prior writes in the thread's transaction, then the current thread must hold the write-lock. In this case the commit operation is a no-op. An M4 operation is guaranteed to commit normally (no aborts) if the thread manages to acquire (and validate) the M4 lock at the time of the first transactional write.

For example, in step 255, a respective process 140-1 can initially verify that current global version information 120-1 matches the data value of version information 120-1 stored in its local repository 110-1. As discussed above, the process can abort itself if the version information changes during a course of executing a respective processing thread or transaction.

The process 140-1 also can retrieve the global lock bit 120-2 to identify whether another process currently has a lock on shared data 125. If the lock bit is set, process 140-1 aborts a respective transaction. The process 140-1 also can retrieve mode setting information 120-3 to detect a current mode. If the global environment 102 is currently set to mode B, then the process 140-1 can abort itself.

If the global lock bit is not set and the mode is set to mode A, the process 140-1 sets the global lock bit 120-2 to an active state to obtain the lock over shared data 125. Once a lock is obtained, no other processes can modify contents of shared data 125.

In step 256, upon each store, the process 140-1 checks if there is a mode B type of lock on a portion of shared data 125 to be modified. In one embodiment, if the process 140-1 plans to modify contents of segment 210-1, the process 140-1 verifies that lock bit 230-1 is not set; if the process 140-1 plans to modify contents of segment 210-2, the process 140-1 verifies that lock bit 230-2 is not set, and so on. If necessary, the process 140-1 can spin to obtain the lock over shared data 125.

After obtaining a respective lock in step 260, the process 140-1 initiates modification of shared data 125 according to a respective transaction outcome.

In step 265, after modifying shared data 125 the process 140-1 updates the global version information 120-1 with a new value (e.g., to a data value of 000146) and sets the global lock bit 120-2 to an inactive state (e.g., the process releases a respective lock where the lock bit and version information are co-located in a single lock-word). In one embodiment, the process 140-1 simultaneously sets the global lock bit 120-2 low at a same time of updating the global version information 120-1.

More Details Associated with Mode A (e.g., M4 Mode)

In the context of a general embodiment herein, metadata 135 enables each of processes 140 to identify whether content associated with shared data 125 has been "locked" (e.g., via checking lock information 120-2). Additionally, metadata 135 enables the processes 140 to identify whether any portions of shared data 125 have changed during execution of a respective transaction (e.g., via use of version information 120-1).

In one embodiment, version information 120-2 and version information 120-1 form lock-word. A lock-word is a shared global variables that contain version information 120-1 and a lock-bit information 120-2. A given globally accessible shared data structure (e.g., segment) is associated with only one lock-word. We say that lock-word protects or guards that data structure. The lock-word is meta-data that moderates access to the shared data structure.

Each of processes 140 competes to obtain a respective lock on shared data 125. To obtain a lock preventing other processes from modifying shared data 125, a given process writes a logic one to a respective lock bit of lock information 120-2. When set to a logic one, processes 140 other than a respective process holding the lock are, by protocol, unable to modify contents of shared data 125. Critically, M4 is a cooperative protocol. Threads use M4 to avoid races or undesirable interference. It's cooperative in the sense that all threads accessing the shared data will, by convention, use appropriate access protocol. Nothing would stop an errant from accessing the data. Upon release of a lock based on a respective process setting the lock bit to a logic zero, the processes 140 can again compete to obtain a lock on shared data 125.

In addition to lock information 120-2, metadata 135 includes version information 120-1 that is updated each time a respective process modifies contents of shared data 125. Accordingly, the processes 140 can monitor the version information to identify whether shared data 125 has been modified during a respective execution of a processing transaction (e.g., multiple software instructions).

In one embodiment, each of processes 140 stores an instantaneous data value (e.g., sampled version value or sampled version number) of current version information 120-1 in a respective local repository 110 at least some time during a respective execution of a transaction. Throughout this specific, the instantaneous data value is defined as a current value of the version information 120-1 at a time of reading. As discussed throughout this specific, this value changes over time as each of the processes 140 modifies the respective shared data 125 and updates this version information 120-1 to a new value.

Some time after an initial load of version information 120-1 associated with shared data 125, a respective process compares a data value associated with version information 120-1 in global environment 102 to the data value previously stored in its local repository 110 to identify whether another process 140 modified contents of shared data 125. As will be discussed further in this specification, a respective process can abort itself and try again if version information 120-1 changes during respective execution.

Accordingly, the above algorithm includes a single lock that protects all transactions. Conceptually, the technique herein (e.g., a so-called M4 algorithm) is a read-write lock that provides automatic and transparent upgrade from read state to read-write state at the time of the 1st store in a transaction. The lock consists of a version field with the low-order bit serving as a write-lock. We describe M4 here as a specific example of a locking algorithm it may be beneficial to switch with, but anyone skilled in the art will know how to make the described switching mechanism work for another mechanism that implements transactions by having a single lock protect all executed transactions.

One embodiment of the M4 algorithm works as follows. We assume a read-write lock implemented using a single word, which we call the "lockword" (e.g., lock information 120-2) with a version field (e.g., version information 120-1).

1. According to one embodiment, on a transactional load:
   (a) if the loading thread holds the write-lock the load simply executes the load as normal.
   (b) If the thread doesn't hold the write-lock it loads the lockword.
   i. If the lockword indicates that some other thread holds the write-lock, the reading thread aborts immediately and retries.
   ii. Otherwise:
   A. if this is the 1 st transactional load, the thread saves the fetched lockword (which contains the version subfield) into a thread-local variable and then executes the requested load.
   B. If this is not the 1st transactional load the thread checks the just-loaded version against the version saved in the thread's thread-local variable. If they disagree then the thread aborts immediately, otherwise the load executes as normal.

Note that the last two steps A and B can be modified to carry yet another embodiment herein. For example, in one embodiment, a transactional load can be carried out by first fetching data from memory and thereafter fetching (& validating) the version information. However, if this is a first load transaction, then the order of operation can include fetching the version information first, then fetching the shared data, and then fetching the version information again.

2. According to one embodiment, on a transactional store:
   (a) if the storing thread already holds the write-lock, the store executes normally.
   (b) if the storing thread does not hold the write-lock:
   i. If there was a previous transactional load, the thread attempts to CAS (atomic Compare and Swap instruction) the write-lock bit with the previously observed version. If the CAS is successful the thread now holds the write-lock and the store executes normal. If the CAS fails then the transaction aborts immediately.
   ii. If there was no prior transactional load in this transaction the thread loops, trying to toggle the low-order write-lock bit in the lockword from 0 to 1. Once the thread has acquired the write-lock it executes the store or write operation.

According to the M4 technique, there's no need to track read-sets or write-sets so the overhead is quite low. A read set is a set of data locations read during a transaction. A write set is a set of data locations written to during a transaction as discussed in related applications. After a thread acquires the write-lock, it can simply store directly into the global fields without the need to save stores in a log file (e.g., a log file used for undo puporses). Likewise, loads don't need to look-aside into the store-log. Once the write-lock is acquired the operation can't abort.

In a related manner (since there's only one lock) there's no possibility of livelock or deadlock. A classic read-write lock can't normally be upgraded or promoted from read to read-write state without the application having been explicitly and intentionally written to refresh any cached values seen during the read phase. That's because the read-write lock implementation might need to drop the lock to avoid deadlock during the upgrade to a read-write state. The M4 technique as described herein provides for automatic and transparent upgrade from a read-only lock to a read-write lock. M4 tends to be more profitable (e.g., more efficient) in circumstances where read-parallelism exists.

Consider, for example, a hash table where most operations are queries. According to M4, pure readers may operate completely in parallel. Furthermore, the readers do not need to store into a shared location to acquire a lock. Note that traditional SMP systems use snoop- or directory-based cache coherency protocols, concurrent sharing of or access to cache lines tend to incur high latency and consume precious coherency bandwidth if stores to the shared line are frequent. Pure read sharing, however, is typically inexpensive.

Furthermore, A number of variations are possible and it'll pay to enumerate them in the application. To keep things straight I'll call them Validate-after-each-ld (VAL) and validate-at-commit-time (VAC).

Transactional Load in VAL-mode:

```
if (the loading thread holds the write lock) then
    execute the load of the global variable as normal
else
    if (this is 1st load in the thread's txn) then
        load lock-word
        if (lock-word lock-bit is set) then
            optionally spin, waiting for lock-bit to clear
            abort current txn
        else
            save previously fetched lock-word version into
                thread-local txn version variable
    execute the load of the global variable placing result in
        thread-local temporary variable
    load the lock-word
    if (the lock-word's lock-bit is set OR
        the lock-word's version # differs from the thread's
        txn version variable) then abort the txn.
    return the temporary variable (previously fetched value)
        as the result of the txn load
```

Transactional load in VAC-mode:

```
if (the loading thread holds the write lock) then
    execute the load of the global variable as normal
else
    if (this is 1st load in the thread's txn) then load lock-word
        if (lock-word lock-bit is set) then
            optionally spin, waiting for lock-bit to clear
            abort current txn
        else
            save lock-word version into thread-local txn version
                variable
            execute the load of the global variable as normal
```

In VAL-mode we don't need to re-check the version at commit-time whereas we must validate the version at commit-time in VAC-mode. The differences between VAC and VAL boil down to when and where do we validate that the saved txn version remains unchanged. VAC mode moves validation from the txn LD operation to the commit operator and defers validation until commit-time. Recall that validation tells us if the previously read global variables are mutually consistent. VAL mode is one embodiment as it doesn't admit so-called "zombie" transactions. A zombie is a transaction that has read inconsistent data and is doomed, but has yet to validate and abort. Zombies can misbehave, dereferencing illegal pointers, generating divide-by-zero traps, or entering infinite loops. VAC-mode is slightly more efficient, but admits zombies. Zombies require "containment" to prevent their misbehavior from effecting the rest of the system.

Note that VAL- and VAC-mode define two ends of a spectrum. Another valid scheme is to validate periodically during the transaction—less frequently than at every txn load, but more frequently than just at commit-time. Critically, VAL mode is still more efficient than the read-set validation performed by previous software transactional memory implementations (STMs).

Figure 4:
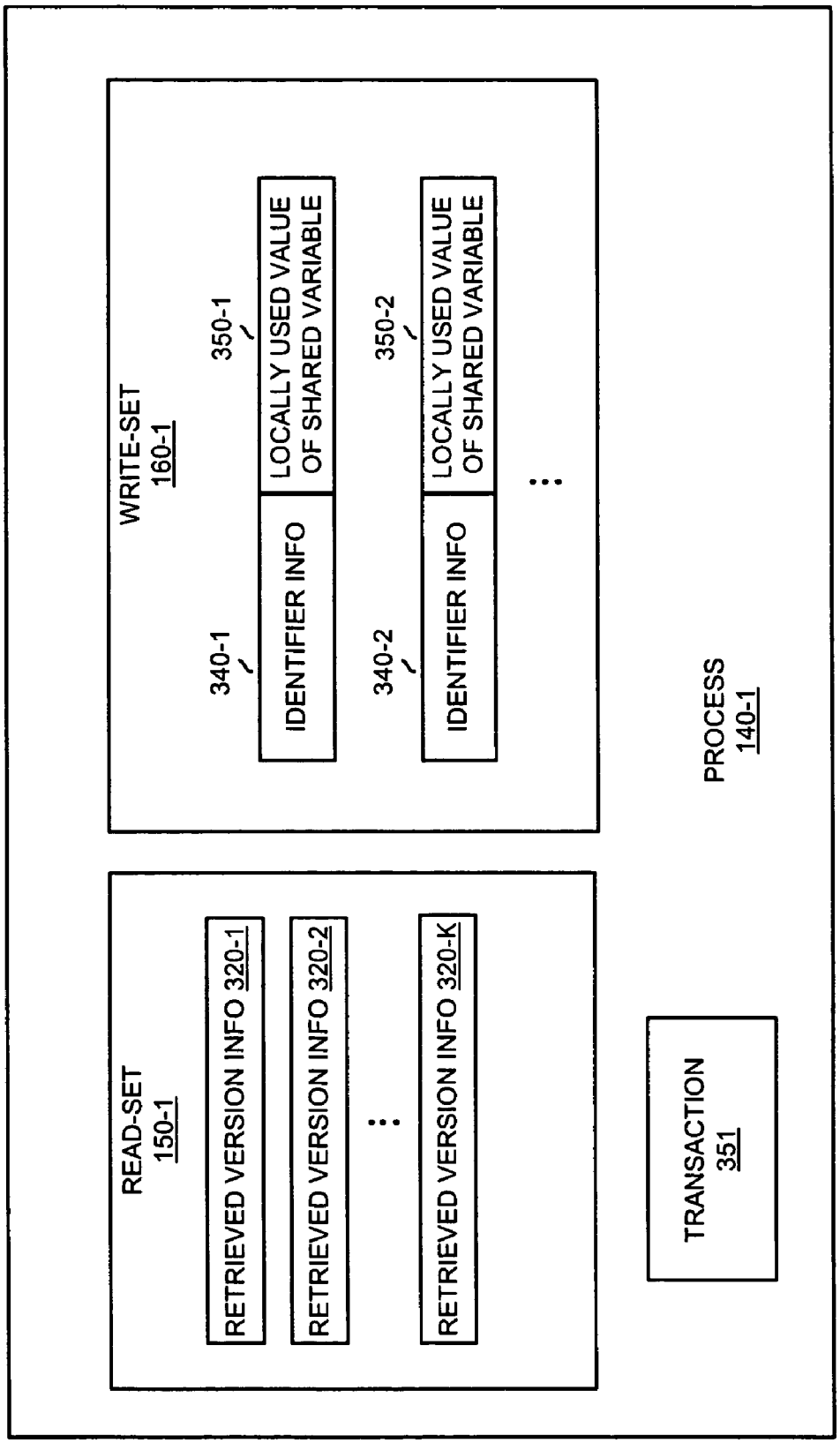
FIG. 4 is a diagram of a process maintaining a respective read-set and write-set according to embodiments herein.
Figure 5:
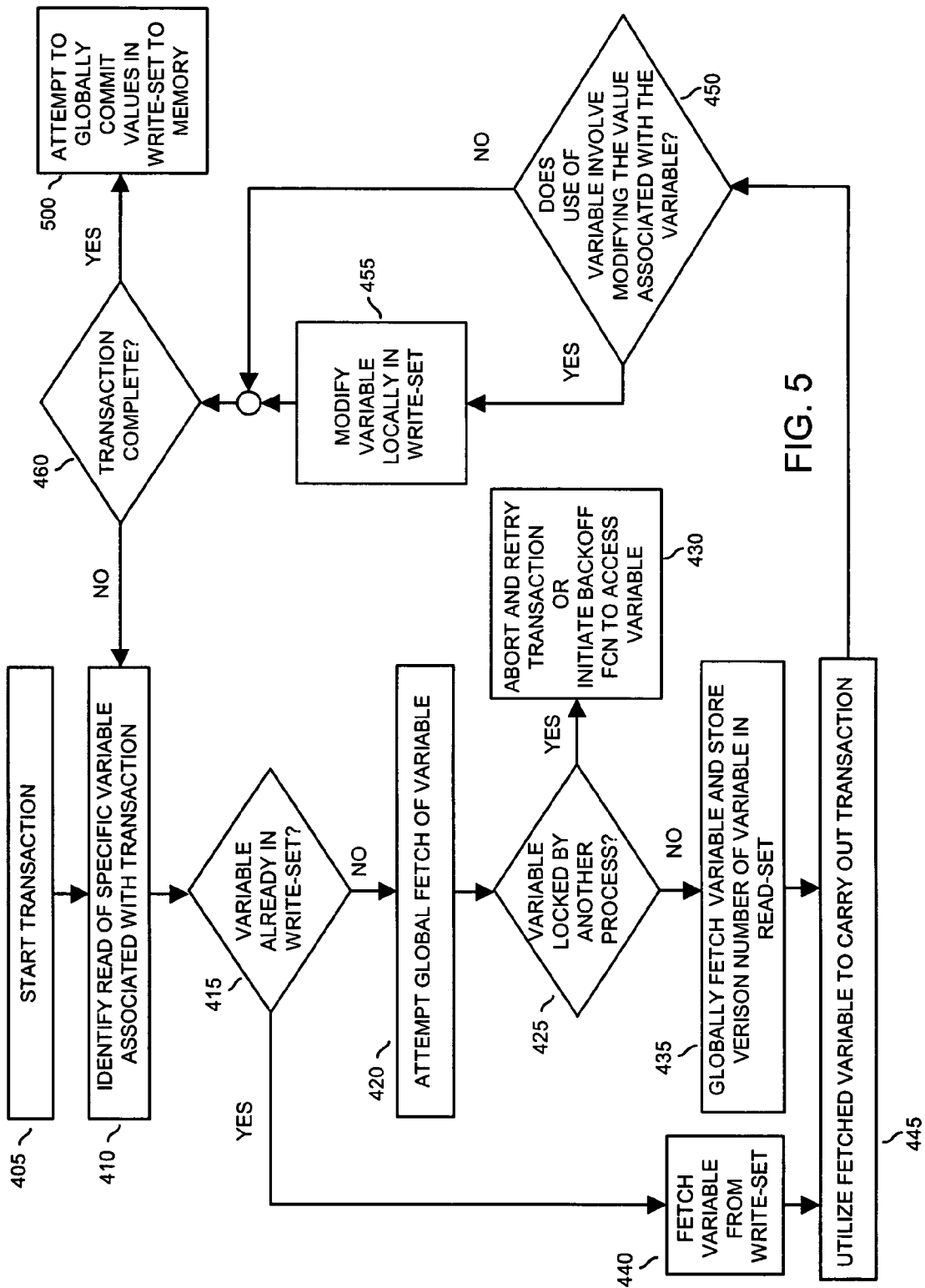
FIG. 5 is a respective flowchart associated with a lock mode according to embodiments herein.
Figure 6:
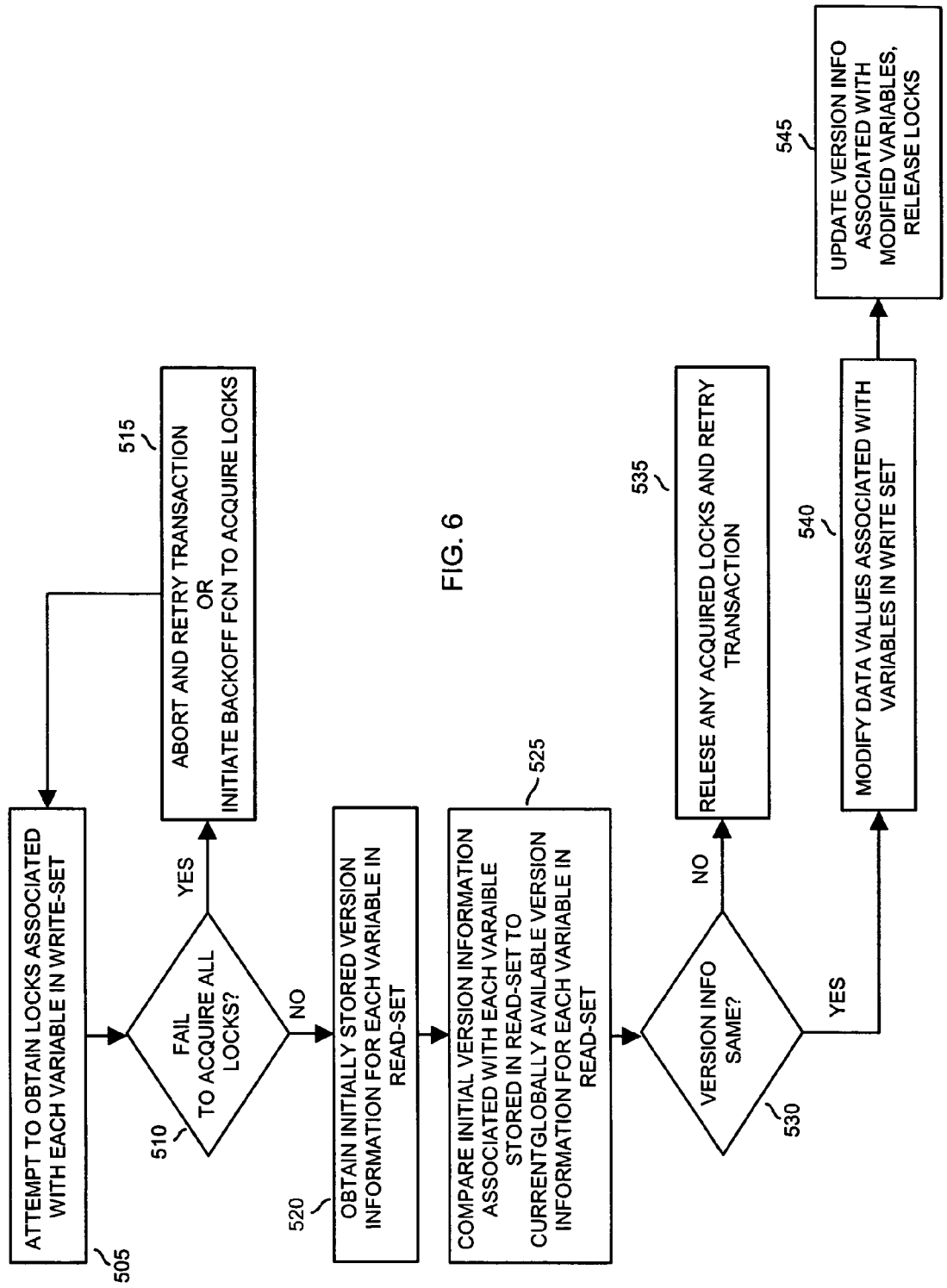
FIG. 6 is a respective flowchart associated with a lock mode according to embodiments herein.

FIGS. 4 through 6 are diagrams illustrating details of respective read-sets 150 and write-sets 160 associated with a distributed type of lock mode (e.g., mode B) according to embodiments herein. In general, a distributed type of lock mode according to embodiments herein includes one in which each of multiple processes 140 compete to simultaneously obtain different locks and modify respective different portions of shared data 125.

As discussed above, to carry out execution of processing threads in mode B (e.g., a transactional locking mode), respective processes 140 utilize respective read-sets 150, respective write-sets 160, and segments of shared data 210, segment version information 220, and segment lock bit information 230. When in mode B, each of multiple processes 140 operate in a similar way as discussed below.

More specifically, as shown in FIG. 4, a sample process such as process 140-1 executes transaction 351 (e.g., a set of software instructions). Read-set 150-1 stores retrieved version information 320-1, retrieved version information 320-2, . . . , retrieved version information 320-K associated with corresponding data values (or segments) accessed from shared data 125 during execution of transaction 351. Accordingly, the process 140-1 can keep track of version information associated with any globally accessed data.

Write-set 160-1 stores shared variable identifier information 340 (e.g., address information, variable identifier information, etc.) for each respective globally shared variable that is locally modified during execution of the transaction 351. Local modification involves maintaining and modifying locally used values of shared variables in write-set 160-1 rather than actually modifying the global variables during execution of transaction 351. As discussed above and as will be further discussed, the process 140-1 attempts to globally commit information in write-set 160-1 to shared data 125 upon completion of transaction 351. In the context of the present example, process 140-1 maintains write-set 160-1 to include i) shared variable identifier information 340-1 (e.g., segment or variable identifier information) of a respective variable accessed from shared data 125 and corresponding locally used value of shared variable 350-1, ii) shared variable identifier information 340-2 (e.g., segment or variable identifier information) of a variable or segment accessed from shared data 125 and corresponding locally used value of shared variable 350-2, an so on. Accordingly, process 140-1 uses write-set 160-1 as a scratch-pad to carry out execution of transaction 351 and keep track of locally modified variables and corresponding identifier information.

FIG. 5 is a flowchart illustrating a more specific use of read-sets 150, write-sets 160, version information 220, and lock information 230 according to embodiments herein. In general, flowchart 400 indicates how each of multiple processes 140 utilizes use of read-sets 150 and write-sets 160 while carrying out a respective transaction.

Step 405 indicates a start of a respective transaction. As previously discussed, a transaction can include a set of software instructions indicating how to carry out one or more computations using shared data 125.

In step 410, a respective process 140 executes an instruction associated with the transaction identifying a specific variable in shared data 125.

In step 415, the respective process checks whether the variable exists in its respective write-set 160. If the variable already exists in its respective write-set 160 in step 420, then processing continues at step 440 in which the respective process 140 fetches a locally maintained value from its write-set 160.

If a locally stored data value associated with the variable does not already exist in its respective write-set 160 (e.g., because the variable was never fetched yet and/or modified locally) as identified in step 415, then processing continues at step 420 in which the respective process 140 attempts to globally fetch a data value associated with the variable based on a respective access to shared data 125. For example, as further indicated in step 425, the process 140 checks whether the variable to be globally fetched is locked by another process. As previously discussed, another process may lock variables, segments, etc. of shared data 125 to prevent others from accessing the variables. Globally accessible lock information 230 (e.g., a single bit of information) in metadata 135 indicates which variables have been locked for use.

If an active lock is identified in step 425, the respective process initiates step 430 to abort and retry a respective transaction or initiate execution of a so-called back-off function to access the variable. In the latter instance, the back-off function can specify a random or fixed amount of time for the process to wait before attempting to read the variable again with hopes that a lock will be released. The respective lock on the variable may be released by during a second or subsequent attempt to read the variable.

If no lock is present on the variable during execution of step 425, the respective process initiates step 435 to globally fetch a data value associated with the specified variable from shared data 125. In addition to globally accessing the data value associated with the shared variable, the respective process retrieves version information 220 associated with the globally fetched variable. The process stores retrieved version information associated with the variable in its respective read-set 150 for later use during a commit phase.

In step 445, the respective process utilizes the fetched data value associated with the variable to carry out one or more computations associated with the transaction. Based on the paths discussed above, the data value associated with the variable can be obtained from either write-set 160 or shared data 125.

In step 450, the process performs a check to identify whether use of the fetched variable (in the transaction) involve modifying a value associated with the fetched variable. If so, in step 455, the process modifies the locally used value of shared variable 350 in write-set 160. The respective process skips executing step 455 if use of the variable (as specified by the executed transaction) does not involve modification of the variable.

In step 460, the respective process identifies whether a respective transaction has completed. If not, the process continues at step 410 to perform a similar loop for each of additional variables used during a course of executing the transaction. If the transaction has completed in step 460, the respective process continues at step 500 (e.g., the flowchart 500 in FIG. 5) in which the process attempts to globally commit values in its write-set 160 to globally accessible shared data 125.

Accordingly, in response to identifying that a corresponding data value associated with one or more shared variable was modified during execution of the transaction, a respective process can abort a respective transaction in lieu of modifying a data value associated with shared data 125 and initiate execution of the transaction again at a later time to produce attempt to produce a respective transaction outcome.

FIG. 6 is a flowchart 500 illustrating a technique for committing results of a transaction to shared data 125 according to embodiments herein. Up until his point, the process executing the respective transaction has not initiated any locks on any shared data yet although the process does initiate execution of computations associated with accessed shared data 125. Waiting to obtain locks at the following "commit phase" enables other processes 140 to perform other transactions in parallel because a respective process initiating storage of results during the commit phase holds the locks for a relatively short amount of time.

In step 505, the respective process that executed the transaction attempts to obtain locks associated with each variable in its write-set 160. For example, the process checks whether lock information in metadata 135 indicates whether the variables to be written to (e.g., specific portions of globally accessible shared data 125) are locked by another process. The process initiates locking the variables (or segments as the case may be) to block other process from using or locking the variables. In one embodiment, a respective process attempts to obtain locks according to a specific ordering such as an order of initiating local modifications to retrieved shared variables during execution of a respective transaction, addresses associated with the globally shared variables, etc.

If all locks cannot be immediately obtained in step 510, then the process can abort and retry a transaction or initiate a back-off function to acquire locks associated with the variables that are locally modified during execution of the transaction.

After all appropriate locks have been obtained by writing respective lock information 230, processing continues at step 520 in which the process obtains the stored version information associated with variables read from shared data 125. As previously discussed, the version information 230 of metadata 135 indicates a current version of the respective variables at a time when they were read during execution of the transaction.

In step 525, the respective process compares the retrieved version information in the read-set 150 saved at a time of accessing the shared variables to the current globally available version information 220 from metadata 135 for each variable in the read-set 150.

In step 530, if the version information is different in step 525, then the process acknowledges that another process modified the variables used to carry out the present transaction. Accordingly, the process releases any obtained locks and retries the transaction again. This prevents the respective process from causing data corruption.

In step 535, if the version information is the same in step 525, then the process acknowledges that no other process modified the variables used to carry out the present transaction. Accordingly, the process can initiate modification of shared data to reflect the data values in the write-set 160. This prevents the respective process from causing data corruption during the commit phase.

Finally, in step 540, after updating the shared data 125 with the data values in the write-set 160, the process updates version information 220 associated with modified variables or segments and releases the locks. The locks can be released in any order or in a reverse order relative to the order of obtaining the locks.

Note that during the commit phase as discussed above in flowchart 500, if a lock associated with a location in the process's write-set 160 also appears in the read-set 150, then the process must atomically: a) acquire a respective lock and b) validate that current version information associated with the variable (or variables) is the same as the retrieved version information stored in the read-set 150. In one embodiment, a CAS (Compare and Swap) operation can be used to accomplish both a) and b).

Also, note that each of the respective processes 140 can be programmed to occasionally, periodically, sporadically, intermittently, etc. check (prior to the committal phase in flowchart 500) whether current version information 220 in metadata 135 matches retrieved version information in its respective read-set 150 for all variables read from shared data 125. Additionally, each of the respective processes 140 can be programmed to also check (in a similar way) whether a data value and/or corresponding segment has been locked by another process prior to completion. If a change is detected in the version information 220 (e.g., there is a difference between retrieved version information 320 in read-set 150 and current version information 220) and/or a lock is implemented on a data value or segment used by a given process, the given process can abort and retry the current transaction, prior to executing the transaction to the commit phase. Early abortion of transactions doomed to fail (because of an other process locking and modifying) can increase overall efficiency associated with parallel processing.

Use of version information and lock information according to embodiments herein can prevent corruption of data. For example, suppose that as an alternative to the above technique of using version information to verify that relied upon information (associated with a respective transaction) has not changed by the end of a transaction, a process reads data values (as identified in a respective read-set) from shared data 125 again at commit time to ensure that the data values are the same as were when first being fetched by the respective process. Unfortunately, this technique can be misleading and cause errors because of the occurrence of race conditions. For example, a first process may read and verify that a globally accessible data value in shared data 125 has not changed while soon after (or at nearly the same time) another respective process modifies the globally accessible data value. This would result in corruption if the first process committed its results to shared data 125. The techniques herein are advantageous because use of version and lock information in the same word prevents corruption as a result of two different processes accessing the word at the same or nearly the same time.

Figure 7:
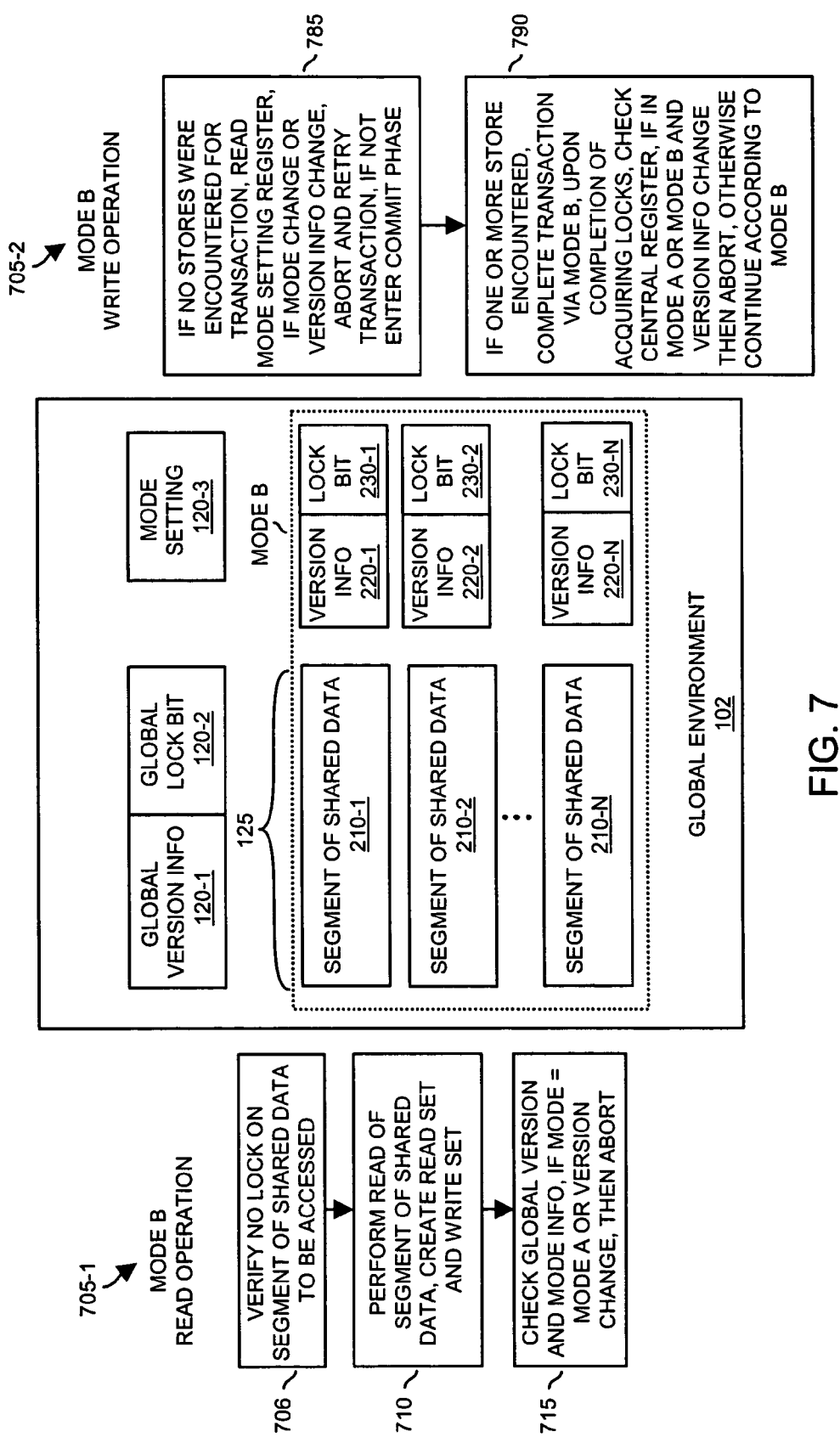
FIG. 7 is a diagram of a second type of lock mode according to embodiments herein.

FIG. 7 is a diagram summarizing respective read and write operations associated with a so-called distributed type of lock mode (e.g., mode B) according to embodiments herein. Because a type of lock mode can change during execution, processes 140 operate in a slightly different manner than when a respective processing environment supports only a distributed type of lock mode.

For example, in step 706 of read operation 705-1, a given process verifies that there is no lock on a segment of shared data to be accessed.

In step 710, the process performs a read of content from a segment of shared data. During execution of a respective transaction, the given process creates a respective read-set 150 and write-set 160 as discussed above.

In step 715, the given process checks the global version information 120-1 and the mode setting information 120-3. If the current mode setting of global environment 102 is mode A or there is a change in the global version information 120-1, then the given process aborts. Otherwise processing can continue until the given process commits its results to memory via write operation 705-2.

In step 785, during a respective write phase, if no stores were encountered during a transaction, the given process reads mode setting information 120-3. If the given process detects a mode change or version information change (e.g., in global version information 120-1), the given process aborts and attempts re-execution of the transaction. Otherwise, processing continues in the following step.

In step 790, if the given process encounters one or more store instructions, then the given process completes execution via mode B. Upon completion of acquiring locks of segments to be modified, the given process checks the central register (e.g., a single register including global version information 120-1, global lock bit 120-2, and mode setting information 120-3). If the central register indicates that a current mode setting is mode A or there is a change with respect to the global version information 120-1 and the global environment 102 is set to mode B, then the given process aborts the transaction. Otherwise, the given process modifies segments of shared data 125 as discussed above in FIG. 4-6.

Figure 8:
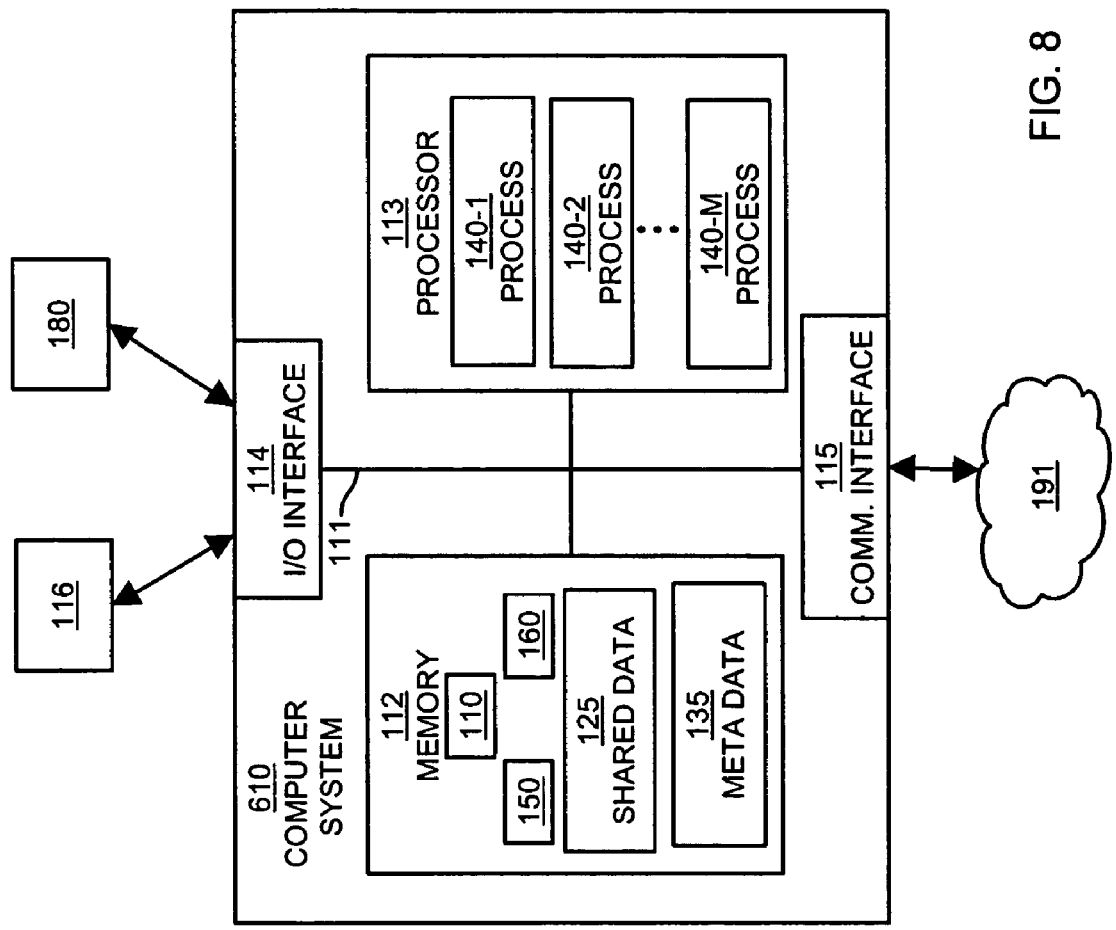
FIG. 8 is a diagram of a sample architecture supporting shared use of data according to embodiments herein.

FIG. 8 is a block diagram illustrating an example computer system 610 (e.g., an architecture associated with computer environment 100) for executing parallel processes 140 (e.g., processing threads) and other related processes according to embodiments herein. Computer system 610 can be a computerized device such as a personal computer, workstation, portable computing device, console, network terminal, processing device, etc.

As shown, computer system 610 of the present example includes an interconnect 111 that couples a memory system 112 storing shared data 125 (e.g., globally accessible shared data), metadata 135 (e.g., global version information 120-1, global lock bit 120-2, mode setting information 120-3, segment version information 220, and segment lock bit information 230), one or more processors 113 executing processes 140 (e.g., process 140-1, process 140-2, . . . , process 140-M), an I/O interface 114, and a communications interface 115. Peripheral devices 116 (e.g., one or more optional user controlled devices such as a keyboard, mouse, display screens, etc.) can couple to processor 113 through I/O interface 114. I/O interface 114 also enables computer system 610 to access repository 180 (that also potentially stores shared data 125 and/or metadata 135). Communications interface 115 enables computer system 610 to communicate over network 191 to transmit and receive information from different remote resources.

Note that each of processes 140 can be executed by the same processor 113 supporting parallel processing of processes 140 or executed by a different set of respective processors executing one or more of processes 140. In one embodiment, each of processes 140 executes a respective transaction associated with the same overall application. However, the processes 140 can be associated with different respective applications.

Further note that functionality associated with processes 140 and/or computer environment 100 can be embodied as software code such as data and/or logic instructions (e.g., code stored in the memory or on another computer readable medium such as a disk) that support functionality according to different embodiments described herein. Alternatively, the functionality associated with processes 140 can be implemented via hardware or a combination of hardware and software code. Processor 113 can be one or multiple separate processors executing multiple processing threads.

It should be noted that, in addition to the processes 140 themselves, embodiments herein include a respective application and/or set of instructions to carry out processes 140. Such a set of instructions associated with processes 140 can be stored on a computer readable medium such as a floppy disk, hard disk, optical medium, etc. The set of instruction can also be stored in a memory type system such as in firmware, RAM (Random Access Memory), read only memory (ROM), etc. or, as in this example, as executable code.

Collective attributes associated with processes 140, global environment 102, and computer environment 100, etc. will now be discussed with respect to flowcharts in FIGS. 9-11. For purposes of this discussion, global environment 102, processes 140 and/or computer environment 100 can execute or carry out the steps described in the respective flowcharts. Note that the steps in the below flowcharts need not always be executed in the order shown.

Figure 9:
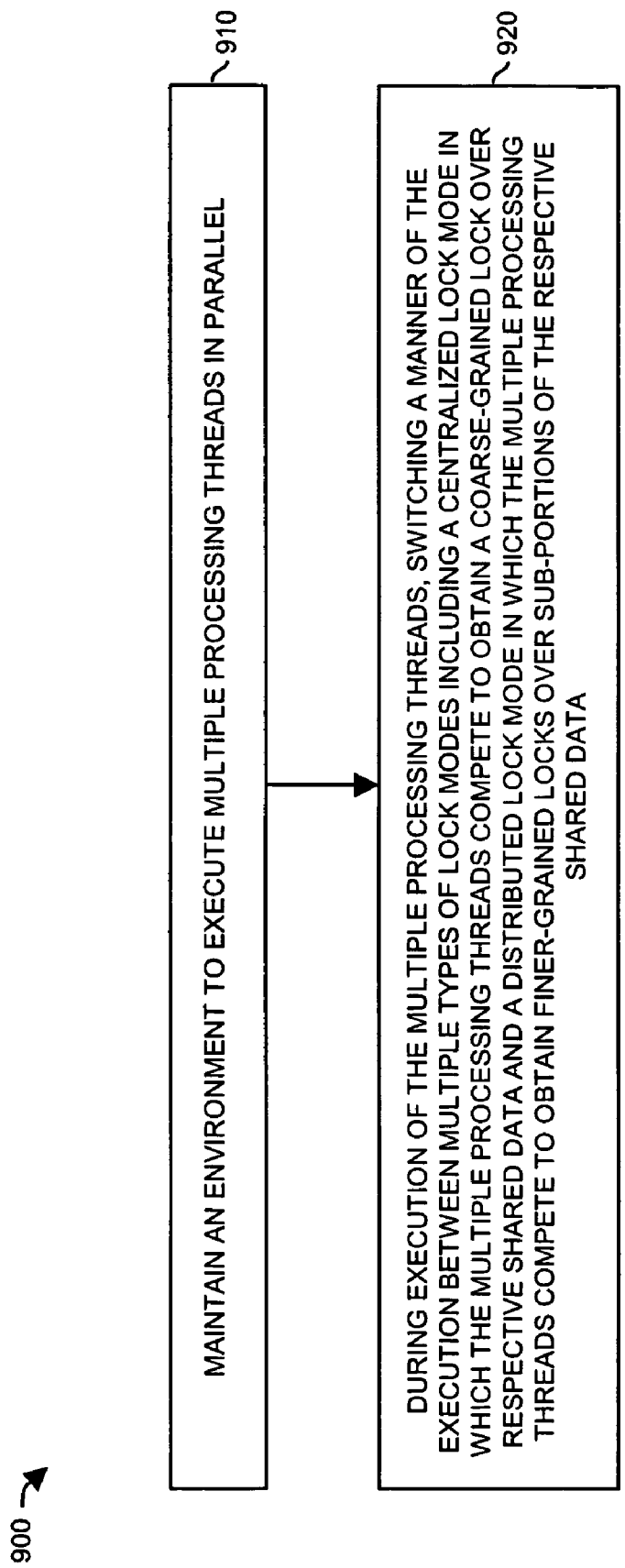
FIG. 9 is a diagram of a flowchart illustrating a technique supporting simultaneous execution of multiple processing threads according to an embodiment herein.

Now, more particularly, FIG. 9 is a flowchart 900 illustrating a technique supporting execution of parallel transactions in computer environment 100 according to an embodiment herein. Note that techniques discussed in flowchart 900 overlap and summarize some of the techniques discussed above.

In step 910, the computer system 610 herein maintains an environment to execute multiple processing threads (e.g., processes 140) in parallel.

In step 920, during execution of multiple processing threads, the computer system 610 enables switching a manner of the execution between multiple types of lock modes including a centralized lock mode in which the multiple processing threads compete to obtain a coarse-grained lock over respective shared data and a distributed lock mode in which the multiple processing threads compete to obtain finer-grained locks over sub-portions of the respective shared data.

Figure 10:
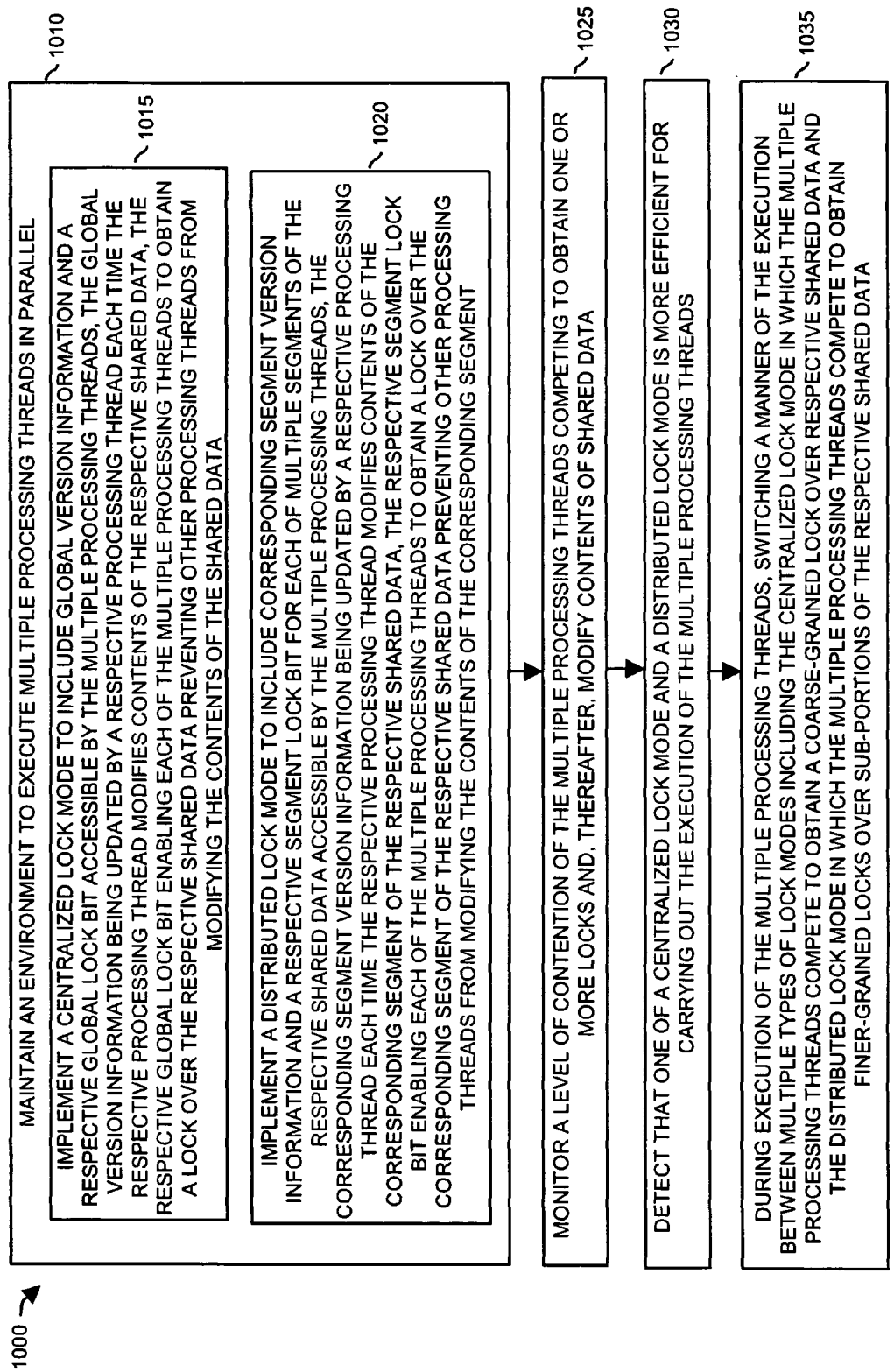
FIG. 10 is a diagram of a flowchart illustrating a technique supporting simultaneous execution of multiple processing threads according to an embodiment herein.

FIG. 10 is a flowchart 1000 illustrating a technique supporting parallel execution of processes 140 according to embodiments herein. Note that techniques discussed in flowchart 1000 overlap with the techniques discussed above in the previous figures.

In step 1010, computer system 610 maintain an environment to execute multiple processing threads in parallel In sub-step 1015 of step 1010, the computer system 610 implements a centralized lock mode to include global version information 120-1 and a respective global lock bit 120-2 accessible by the multiple processing threads. The global version information 120-1 gets updated by a respective processing thread each time a respective processing thread modifies contents of the respective shared data. The respective global lock bit 120-2 enables each of the multiple processing threads to obtain a lock over the respective shared data 125 preventing other processing threads from modifying the contents of the shared data 125.

In sub-step 1020 of step 1010, the computer system 610 implements a distributed lock mode that includes corresponding segment version information 220 and a respective segment lock bit 230 for each of multiple segments of the respective shared data 125. The corresponding segment version information 220 is updated by a respective processing thread each time the respective processing thread modifies contents of the corresponding segment of the respective shared data. The respective segment lock bit 230 enables each of the multiple processing threads to obtain a lock over the corresponding segment of the respective shared data preventing other processing threads from modifying the contents of the corresponding segment.

In step 1025, a lock contention monitor 122 monitors a level of contention of the multiple processing threads (i.e., processes 140) competing to obtain one or more locks and, thereafter, modify contents of shared data 125.

In step 1030, a mode controller 124 detect that one of a centralized lock mode and a distributed lock mode is more efficient for carrying out the execution of the multiple processing threads.

In step 1035, during execution of the multiple processing threads, the mode controller 124 switches a manner of the execution between the multiple types of lock modes. For example, the mode controller 124 switches between the centralized lock mode in which the multiple processing threads compete to obtain a coarse-grained lock over respective shared data and the distributed lock mode in which the multiple processing threads compete to obtain finer-grained locks over sub-portions of the respective shared data.

As discussed above, techniques herein are well suited for use in applications such as those that support parallel processing threads in the same processor or in different processors. However, it should be noted that configurations herein are not limited to such use and thus configurations herein and deviations thereof are well suited for use in other environments as well.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

We claim:
1. A method comprising:
maintaining an environment to execute multiple processing threads in parallel;
during execution of the multiple processing threads, switching a manner of the execution between non-transactional memory usage in which the multiple processing threads compete to obtain a coarse-grained lock over a region of respective shared data, and transactional memory usage in which the multiple processing threads compete to obtain finer-grained locks over sub-portions of the respective shared data; and
initiating the non-transactional memory usage to include global version information and a respective global lock bit accessible by the multiple processing threads, the global version information being updated by a respective processing thread each time the respective processing thread modifies contents of the respective shared data, the respective global lock bit enabling each of the multiple processing threads to obtain a lock over the respective shared data preventing other processing threads from modifying the contents of the shared data; and initiating the transactional memory usage to include a distributed lock mode, the distributed lock mode including corresponding segment version information and a respective segment lock bit for each of multiple segments of the respective shared data accessible by the multiple processing threads, the corresponding segment version information being updated by a respective processing thread each time the respective processing thread modifies contents of the corresponding segment of the respective shared data, the respective segment lock bit enabling each of the multiple processing threads to obtain a lock over the corresponding segment of the respective shared data preventing other processing threads from modifying the contents of the corresponding segment.

2. A method as in claim 1, wherein switching the manner of execution includes:

switching between multiple types of lock modes including a centralized lock mode associated with non-transactional memory usage in which the multiple processing threads compete to obtain a coarse-grained lock over respective shared data and a distributed lock mode associated with transactional memory usage in which the multiple processing threads compete to obtain finer-grained locks over sub-portions of the respective shared data, the method further comprising:

monitoring a level of contention of the multiple processing threads competing to obtain locks and, thereafter, modify contents of the respective shared data; and wherein switching the manner of the execution occurs in response to detecting that one of the central lock mode and the distributed lock mode is more suitable for carrying out the execution of the multiple processing threads.

3. A method as in claim 2, wherein switching the manner of the execution between the multiple types of lock modes initially requires that a global lock bit associated with the centralized lock mode be in an inactive state in which none of the multiple processing threads currently has a lock over the respective shared data.

4. A method as in claim 2, wherein switching the manner of the execution between the multiple types of lock modes at least in part includes performing an atomic write to a repository in order to simultaneously change: i) mode information identifying a current lock mode setting of the environment, ii) version information normally used to indicate that contents of the respective shared data have been updated, and iii) global lock information to indicate release of a respective lock over the respective shared data.

5. A method as in claim 2 further comprising:

for the centralized lock mode, providing global version information that changes to a new respective data value each time one of the multiple processing threads modifies contents of the respective shared data, a given processing thread of the multiple processing threads accessing the global version information multiple times during execution of a respective transaction in order to identify whether any other processing threads modified the contents of the globally accessible shared data during execution of the given thread.

6. A method as in claim 1, wherein switching the manner of the execution occurs in response to detecting which one of the transactional memory usage and the non-transactional memory usage would be a more efficient memory usage mode to carry out the execution of the multiple processing threads; and the method further comprising initiating a change of a currently implemented memory usage mode associated with the environment to the more efficient memory usage mode.

7. A method as in claim 1 further comprising:

maintaining globally accessible mode setting information enabling each of the multiple processing threads to identify a current memory usage mode of the environment for executing the multiple processing threads in parallel.

8. A method as in claim 7 further comprising:

enabling the multiple processing threads to identify a type of memory usage mode and selectively abort further execution.

9. A method as in claim 1 further comprising:

implementing the non-transactional memory usage of shared data in which a given processing thread carries out steps of:

during a read phase, verifying that no other processing threads modifies contents of the respective shared data by monitoring global version information that is updated to a new value upon each modification to the respective shared data;

after the read phase, checking whether any one of the other processing threads currently has a lock on the respective shared data;

if there is a lock as indicated by the checking, then abort and re-execute a given processing thread;

if there is not a lock as indicated by the checking, initiating a respective commit phase with respect to the given processing thread, the commit phase including:

i) obtaining a respective lock on the respective shared data which prevents the other processing threads from modifying the respective shared data, ii) initiate modification of the respective shared data in accordance with a respective transaction outcome associated with the given processing thread, and iii) after the modification of the respective shared data, updating a respective data value associated with the global version information to indicate to the other processing threads that the respective shared data has been modified.

10. A method as in claim 9, further comprising:

implementing the transactional memory usage of respective shared data in which a given processing thread carries outs steps of:

maintaining copies of version information associated with respective segments of the shared data in a locally managed read set associated with a respective transaction carried out by the given processing thread, the read set not being accessible by the other processes using the respective shared data, the read set identifying versions associated with each of the respective segments of shared data used to generate a respective transaction outcome, the copies of version information indicating respective versions of multiple accessed segments at a time when the respective transaction retrieves respective data values associated with the multiple segments of shared data from the environment; and after acquiring a respective lock associated with a given segments of the respective shared data, verifying that current version information associated with each of the multiple segments of shared data previously used to generate the respective transaction outcome matches the version information in the locally managed read set associated with the respective transaction.

11. A computer readable media encoded with a computer program including:
   instructions to initiate execution of at least one processing thread of multiple processing threads executed in parallel;
   instructions to switch a manner of the execution of the at least one processing thread between non-transactional memory usage in which the multiple processing threads compete to obtain a coarse-grained lock over a region of respective shared data, and transactional memory usage in which the multiple processing threads compete to obtain finer-grained locks over sub-portions of the respective shared data; and
   instructions to initiate the non-transactional memory usage to include global version information and a respective global lock bit accessible by the multiple processing threads, the global version information being updated by a respective processing thread each time the respective processing thread modifies contents of the respective shared data, the respective global lock bit enabling each of the multiple processing threads to obtain a lock over the respective shared data preventing other processing threads from modifying the contents of the shared data; and
   instructions to initiate the transactional memory usage to include a distributed lock mode, the distributed lock mode including corresponding segment version information and a respective segment lock bit for each of multiple segments of the respective shared data accessible by the multiple processing threads, the corresponding segment version information being updated by a respective processing thread each time the respective processing thread modifies contents of the corresponding segment of the respective shared data, the respective segment lock bit enabling each of the multiple processing threads to obtain a lock over the corresponding segment of the respective shared data preventing other processing threads from modifying the contents of the corresponding segment.

12. A computer readable media as in claim 11, the computer program further comprising:
   instructions to check globally accessible information indicating a current respective memory usage mode for carrying out the multiple processing threads in parallel; and
   instructions to switch the manner of the execution of the at least one processing thread in response to detecting a change from one of the transactional memory usage and the non-transactional memory usage to a more suitable memory usage mode for carrying out the execution of the multiple processing threads.

13. A computer readable media as in claim 11, the computer program further comprising:
   instructions to abort execution of a respective transaction associated with the at least one processing thread after identifying a change in a type of memory usage to either transactional memory usage or non-transactional memory usage.

14. A computer system including:
   multiple processing threads executing in parallel;
   a global environment accessible by the multiple processing threads, the global environment including i) shared data utilized by the multiple processing threads, ii) mode setting information indicating a current lock mode for executing the multiple processing threads in parallel, the current lock mode being one of a first lock mode for implementing multi-lock based transactional memory usage and a second lock mode for implementing single-lock based memory usage of the shared data;
   wherein the second lock mode is a centralized lock mode in which the multiple processing threads compete to obtain a coarse-grained lock over the shared data;
   wherein the first lock mode is a distributed lock mode in which the multiple processing threads compete to obtain finer-grained locks over sub-portions of the shared data wherein the global environment includes:
   global lock information enabling a respective one of the multiple processing threads to obtain a respective lock and prevent other processing threads from modifying any of the shared data when in the first lock mode; and
   segment lock information for each of multiple segments of the region of shared data, the segment lock information enabling a respective one of the multiple processing threads to obtain a respective lock and prevent other processing threads from modifying contents of a corresponding segment of the shared data when in the second lock mode;
   global version information enabling a respective one of the multiple processing threads to identify whether contents of the shared data has been modified by another processing thread because each of the multiple processing threads updates a value of the global version information upon modification of the shared data when in the first lock mode; and
   segment version information for each of multiple segments of the shared data, the segment version information associated with the multiple segments enabling a respective one of the multiple processing threads to identify whether contents of any corresponding segments of the shared data have been modified by another processing thread because each of the multiple processing threads updates a value of corresponding segment version information upon modification of the corresponding segment of shared data when in the second lock mode.

* * * * *